(12) United States Patent
He et al.

(10) Patent No.: US 10,841,566 B2
(45) Date of Patent: Nov. 17, 2020

(54) METHODS AND APPARATUS OF VIEWPORT ADAPTIVE 360 DEGREE VIDEO DELIVERY

(71) Applicant: Vid Scale, Inc., Wilmington, DE (US)

(72) Inventors: Yong He, San Diego, CA (US); Yan Ye, San Diego, CA (US); Srinivas Gudumasu, San Diego, CA (US); Eduardo Asbun, Santa Clara, CA (US); Ahmed Hamza, Montreal (CA)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 16/304,443

(22) PCT Filed: May 26, 2017

(86) PCT No.: PCT/US2017/034770
§ 371 (c)(1),
(2) Date: Nov. 26, 2018

(87) PCT Pub. No.: WO2017/205794
PCT Pub. Date: Nov. 30, 2017

(65) Prior Publication Data
US 2019/0158815 A1 May 23, 2019

Related U.S. Application Data

(60) Provisional application No. 62/342,158, filed on May 26, 2016.

(51) Int. Cl.
*H04N 13/282* (2018.01)
*H04N 19/597* (2014.01)
(Continued)

(52) U.S. Cl.
CPC ......... *H04N 13/282* (2018.05); *H04N 13/117* (2018.05); *H04N 13/354* (2018.05);
(Continued)

(58) Field of Classification Search
CPC .. H04N 13/117; H04N 13/282; H04N 13/354; H04N 19/597; H04N 19/70;
(Continued)

(56) References Cited

U.S. PATENT DOCUMENTS

2013/0100132 A1* 4/2013 Katayama ............ H04N 13/275
345/420
2013/0195204 A1 8/2013 Reznik et al.
(Continued)

FOREIGN PATENT DOCUMENTS

WO 2015008774 A1 1/2015
WO WO 2015/197815 A1 12/2015

OTHER PUBLICATIONS

Information technology—Dynamic adaptive streaming over HTTP (DASH)—Part 1: Media presentation description and segment formats, ISO/IEC 23009-1, Second edition May 15, 2014.*
(Continued)

*Primary Examiner* — Mohammed S Rahaman
(74) *Attorney, Agent, or Firm* — Condo Roccia Koptiw LLP

(57) ABSTRACT

Systems, methods, and instrumentalities are disclosed for client centric service quality control. A first viewport of a 360 degree video may be determined. The 360 degree video may comprise one or more of an equirectangular, a cubemap, a cylindrical, a pyramidal, and/or a spherical projection mapping. The first viewport may be associated with a spatial region of the 360 degree video. An adjacent area that extends around the spatial region may be determined. A second viewport of the 360 degree video may be determined. A bitstream associated with the 360 degree video may be received. One or more enhanced regions may be included in the bitstream. The one or more enhanced regions may correspond to the first and/or second viewport, A high
(Continued)

coding bitrate may be associated with the first viewport and/or the second viewport.

14 Claims, 27 Drawing Sheets

(51) Int. Cl.
*H04N 21/8543* (2011.01)
*H04N 21/2343* (2011.01)
*H04N 19/70* (2014.01)
*H04N 21/845* (2011.01)
*H04N 21/4728* (2011.01)
*H04N 21/81* (2011.01)
*H04N 13/117* (2018.01)
*H04N 13/354* (2018.01)

(52) U.S. Cl.
CPC .......... *H04N 19/597* (2014.11); *H04N 19/70* (2014.11); *H04N 21/23439* (2013.01); *H04N 21/234327* (2013.01); *H04N 21/234345* (2013.01); *H04N 21/4728* (2013.01); *H04N 21/816* (2013.01); *H04N 21/8456* (2013.01); *H04N 21/8543* (2013.01)

(58) Field of Classification Search
CPC ... H04N 21/234327; H04N 21/234345; H04N 21/23439; H04N 21/4728; H04N 21/816; H04N 21/8456; H04N 21/8543
See application file for complete search history.

(56) References Cited

U.S. PATENT DOCUMENTS

| | | | |
|---|---|---|---|
| 2016/0150212 | A1 | 5/2016 | Moura et al. |
| 2016/0165309 | A1 | 6/2016 | Van Brandenburg et al. |
| 2016/0260196 | A1 | 9/2016 | Roimela et al. |
| 2017/0118540 | A1* | 4/2017 | Thomas ............ H04N 21/2343 |
| 2017/0339392 | A1* | 11/2017 | Forutanpour ........ H04N 13/161 |
| 2017/0346866 | A1* | 11/2017 | Champel ................ H04L 65/60 |
| 2017/0347026 | A1* | 11/2017 | Hannuksela ........... H04N 19/00 |
| 2019/0191194 | A1 | 6/2019 | Shinobu et al. |

OTHER PUBLICATIONS

Abbas, Adeel, "GoPro Test Sequences for Virtual Reality Video Coding", JVET-O0021, 3rd Meeting: Geneva, CH, May 26-31, 2016, 10 pages.
Choi, Byeongdoo, "Technologies under Consideration for Omnidirectional Media Application Format", ISO/IEC JTC1/SC29/WG11 N15946, San Diego, CA, US, Feb. 2016, 16 pages.
Corbillon et al., "Viewport-Adaptive Navigable 360-Degree Video Delivery", Telecom Bretagne, France, 2016, 7 pages.
Deventer et al., "White Paper on Spatial Relationship Description in MPEG DASH Part 1 AMD2", ISO/IEC JTC1/SC29/WG11 N15819, Geneva, Switzerland, Oct. 2015, 3 pages.
Facebook, "Next-Generation Video Encoding Techniques for 360 Video and VR", Available at http://code.facebook.com/posts/1126354007399553/next-generation-video-encoding-techniques-for-360-video-and-vr/, Jan. 2016, 5 pages.
Hannuksela et al., "DASH/OMAF: Virtual Reality Video Descriptor", Nokia, MPEG 2016/M38613, Geneva, CH, May-Jun. 2016, 5 pages.
ISO/IEC, "Information Technology-Dynamic Adaptive Streaming over HTTP (DASH)—Part 1: Media Presentation Description and Segment Formats", ISO/IEC 23009-1:2014(E), 2014, 152 pages.
ITU-T, "High Efficiency Video Coding", Version 1, Recommendation ITU-T H.265, Apr. 2013, 317 pages.
ITU-T, "High Efficiency Video Coding", Version 2, Recommendation ITU-T H.265, Oct. 2014, 540 pages.
Sodagar, Iraj, "The MPEG-DASH Standard for Multimedia Streaming Over the Internet", IEEE, vol. 18, No. 4, Dec. 31, 2011, pp. 62-67.
Thomas et al., "Spatially Segmented Content Description", ISO/IEC JTC1/SC29/WG11 MPEG2013/m28883, Incheon, South Korea, Apr. 2013, 12 pages.
Wang et al., "Mixing Tile Resolutions in Tiled Video: A Perceptual Quality Assessment", Proceedings of Network and Operating System Support on Digital Audio and Video Workshop, Mar. 19-21, 2014, 23 pages.
Yip et al., "Technologies under Considerations for ISO/IEC 23000-20 Omnidirectional Media Application Format", ISO/IEC JTC1/SC29/WG11 MPEG2017/W16637, Geneva, Switzerland, Jan. 2017, 50 pages.
Alouache et al., "An Adapted Block-Matching Method for Optical Flow Estimation in Catadioptric Images", IEEE, International Conference on Multimedia Computing and Systems (ICMCS), Apr. 14-16, 2014, 6 pages.
Choi et al., "Proposed Text for Omnidirectional Media Application Format", ISO/IEC JTC1/SC29/WG11 MPEG2016/M37837, Feb. 2016, 13 pages.
Facebook, "Optimizing 360 Video for Oculus", Facebook for Developers, Available at <https://developers.facebook.com/videos/f8-2016/optimizing-360-video-for-oculus/>, Apr. 13, 2016, pp. 1-3.
Facebook, "The Technology Behind 360 Video", Facebook for Developers, Available at <https://developers.facebook.com/videos/f8-2016/the-technology-behind-360-video/>, Apr. 13, 2016, pp. 1-2.
ISO/IEC, "Information Technology-Coding of Audio-Visual Objects-Part 12: ISO Base Media File Format", ISO/IEC 14496-12:2015(E), Dec. 15, 2015, 248 pages.
ISO/IEC, "WD of ISO/IEC 23009-3 2nd Edition AMD1 DASH Implementation Guidelines", ISO/IEC JTC1/SC29/WG11 N15990, Feb. 2016, 49 pages.
ISO/IEC, "Requirements for OMAF", Requirements, ISO/IEC JTC1/SC29/WG11 N16143, San Diego, CA, US, Feb. 2016, 2 pages.

* cited by examiner

VIEWPORT CHANGING FROM A TO B

DASH SEGMENT PLAYBACK
TIMELINE (A) CUBE LAYOUT (B) 2x3 LAYOUT (C) POLES ON THE SIDE (HALF HEIGHT) LAYOUT (D) SINGLE ROW LAYOUT

METHODS AND APPARATUS OF VIEWPORT ADAPTIVE 360 DEGREE VIDEO DELIVERY

CROSS-REFERENCE TO RELATED APPLICATIONS

This application is the National Stage Entry under 35 U.S.C. § 371 of Patent Cooperation Treaty Application No. PCT/US2017/034770, filed May 26, 2017, which claims priority to and the benefit of U.S. Provisional Application Ser. No. 62/342,158, filed May 26, 2016, which is hereby incorporated by reference herein.

BACKGROUND

360° video is a rapidly growing format emerging in the media industry. 360° video is enabled by the growing availability of virtual reality (VR) devices. 360° video may provide the viewer a new sense of presence. When compared to rectilinear video (e.g., 2D or 3D), 360° video may pose difficult engineering challenges on video processing and/or delivery. Enabling comfort and/or an immersive user experience may require high video quality and/or very low latency. The large video size of 360° video may be an impediment to delivering the 360° video in a quality manner at scale.

360° video applications and/or services may encode the entire 360° video into a standard compliant stream for progressive downloading and/or adaptive streaming. Delivering the entire 360° video to the clients may enable low-latency rendering (e.g., the client may have access to the entirety of the 360° video content and/or can choose to render the portion it desires to see without further constraint). From the server's perspective, the same streams can support multiple users with possibly different viewports. The video size may be tremendously high, incurring high transmission bandwidth when the video is delivered (e.g., because the entire 360° video has to be encoded in high quality, such as 4K@60 fps or 6K@90 fps per eye). The high bandwidth consumption during delivery may be wasted, for example, because the user may only view a small portion (e.g., a viewport) of the entire picture.

SUMMARY

Systems, methods, and instrumentalities are disclosed for viewport adaptive 360° video delivery. Viewport enhancement based 360 degree video may be delivered and/or signaled. 360 degree video may be delivered using a layer-based viewport overlay. Signaling of 360 degree video mapping may be provided.

A first viewport of a 360 degree video may be determined. The 360 degree video may comprise one or more of an equirectangular, a cube-map, a cylindrical, a pyramidal, and/or a spherical projection mapping. The first viewport may be associated with a spatial region of the 360 degree video. An adjacent area that extends around the spatial region may be determined. A second viewport of the 360 degree video may be determined. A bitstream associated with the 360 degree video may be received. The bitstream may comprise one or more enhanced regions. The one or more enhanced regions may correspond to the first and/or second viewport. A high coding bitrate may be associated with the first viewport and/or the second viewport. Signaling, that indicates one or more viewport properties associated with the 360 degree video delivery, may be received.

A WTRU, for processing a 360 degree video may include a processor configured, (e.g., with executable instructions saved in memory), for one or more of the following: (i) receiving a media presentation description (MPD) associated with a 360 degree video comprising an essential property element that indicates a face-packing layout for a multi-face geometric projection format of a media segment; (ii) receiving the media segment; (iv) determining, based on the essential property element, at least one face-packing layout, from a set of face-packing layouts, for the received media segment; and (iv) constructing the received media segment based on the determined at least one face-packing layout.

The set of face-packing layouts comprise plate carree, poles on the side half height, poles on the side full height, single row, two by three, and one hundred and eighty degrees. The essential property element may be at one of an adaptation level and a representation level.

A WTRU processor may be configured, (e.g., with executable instructions saved in memory), to determine a media representation, that is associated with the MPD, to request for future media segments and to send a request for the determined media representation.

The MPD may include a video type, selected from a set of video types, for the media segment. The set of video types may include comprise rectilinear, panorama, sphere, and lightfield formats. The WTRU processor may be configured, (e.g., with executable instructions saved in memory), to determine the video type for the received media segment and/or to construct the received media segment using the determined video type.

The MPD may include at least one projection format used for projecting the 360 degree video from an omnidirectional format to a rectilinear video frame. The projection format may include one of a equirectangular, cube, an offset cube, a squished sphere, a pyramid, and a cylinder. The WTRU processor may be configured, (e.g., with executable instructions saved in memory), to determine a projection format for receiving a video file and/or to send a request for the determined projection format. The 360 degree video may include an Omnidirectional Media Application Format (OMAF) file.

A method of using a WTRU for processing a 360 degree video may include one or more of: (i) receiving a media presentation description (MPD) associated with a 360 degree video comprising an essential property element that indicates a face-packing layout for a multi-face geometric projection format of a media segment; (ii) receiving the media segment; (iii) determining, based on the essential property element at least one face-packing layout, from a set of face-packing layouts, for the received media segment; and (iv) constructing the received media segment based on the determined at least one face-packing layout.

The method of using a WTRU may include determining a media representation, that is associated with the MPD, to request for future received vide files and/or sending a request for the determined media representation. The method may include determining the video type for the received media segment and/or constructing the received media segment using the determined video type. The method may include determining a projection format for a video file and/or sending a request for the determined projection format.

A WTRU for processing a 360 degree video file my include a processor configured (e.g., with executable instructions saved in memory) for one or more of: receiving a media presentation description (MPD), associated with a 360 degree video, that includes a first essential property element that, indicates a first face-packing layout, for a multi-face geometric projection format of a media segment, and a second essential property element that, indicates a first second-packing layout, for a multi-face geometric projection format of a media segment; determine whether to use the first or the second face-packing layout for the media segment; request the determined at least first or the second face-packing layout; receive the media segment; and reconstruct the 360 degree video associated with the received media segment based on the requested face-packing layout.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1:
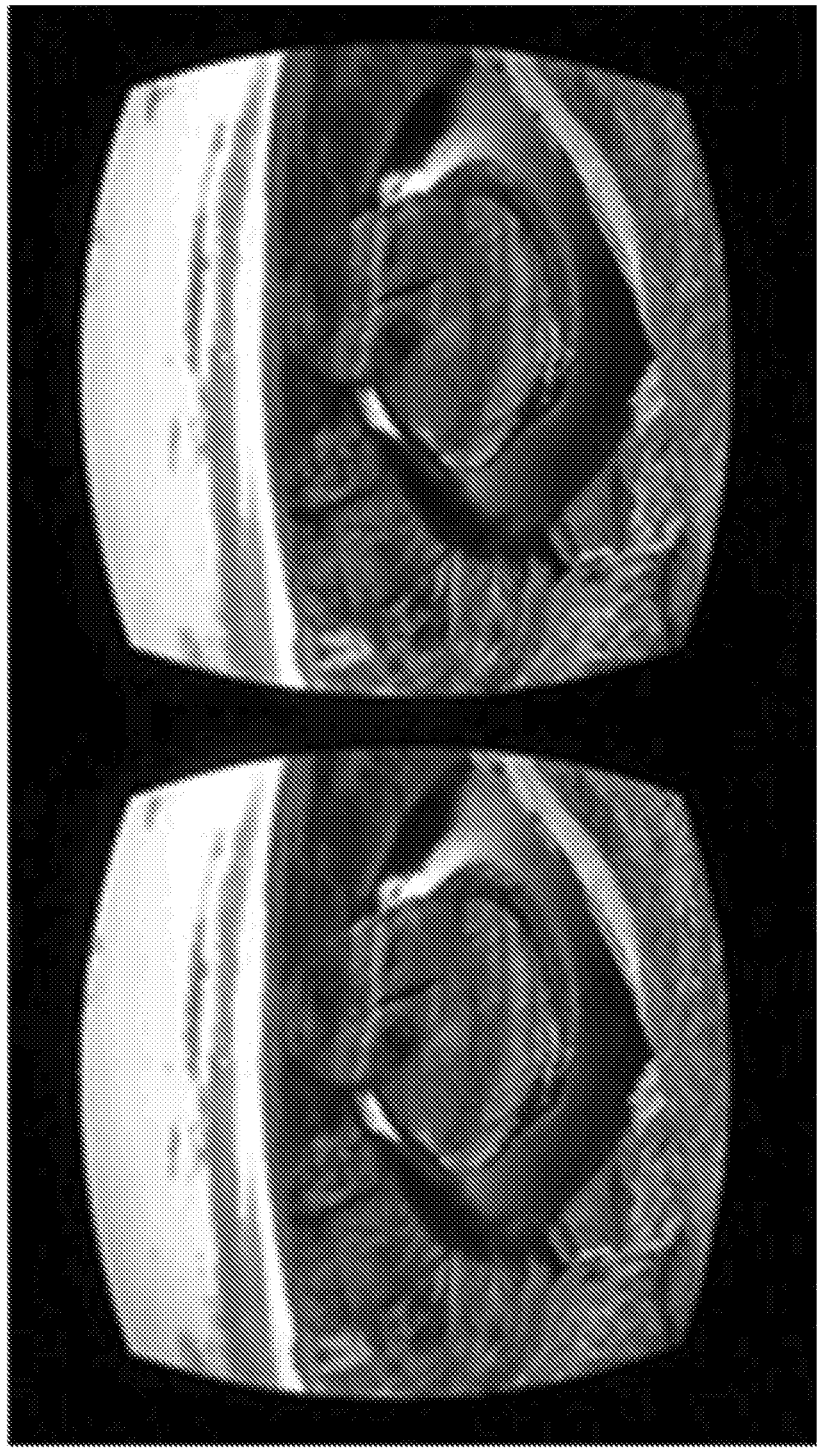
FIG. 1 depicts an example portion of 360° video displayed on a head mounted device (HMD).

FIG. 1 depicts example portion of 360° video displayed on a head mounted device (HMD). When viewing a 360° video, a user may be presented with a part of the video, for example, as shown in FIG. 1. The part of the video may be changed when the user looks around and/or zooms the image. The part of the video may be changed based on feedback provided by the HMD and/or other types of user interface (e.g., a wireless transmit/receive unit (WTRU)). A viewport may be or may include a spatial region of the entire 360° video. The viewport may be fully or partially presented to the user. The viewport may have one or more different qualities than other parts of the 360° video.

Figure 2:
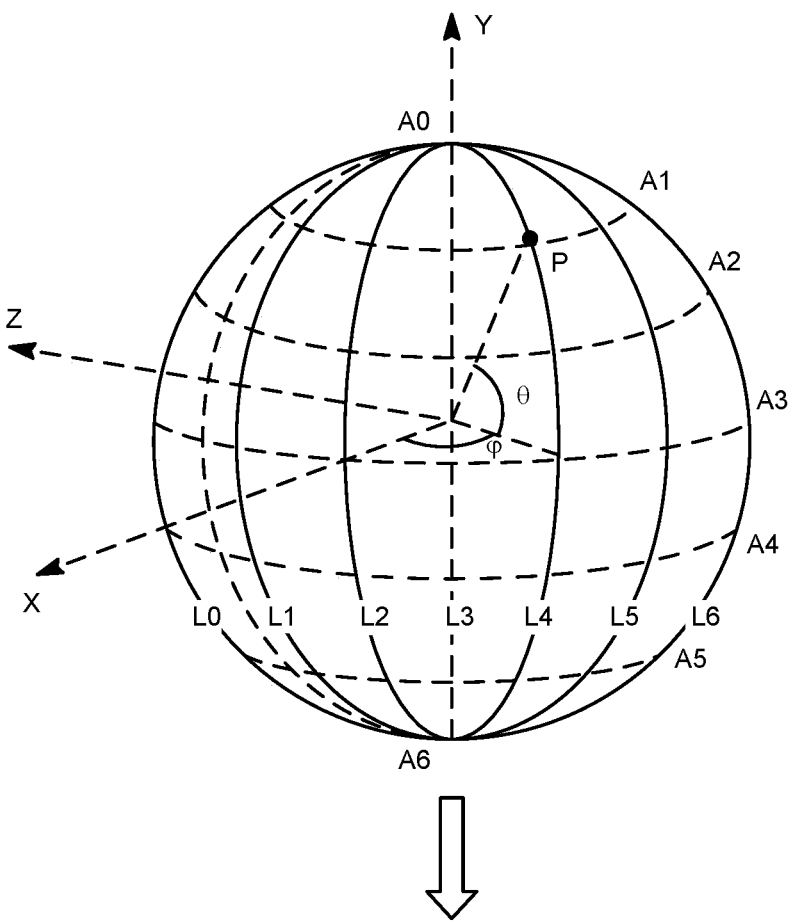
FIG. 2 depicts an example equirectangular projection for a 360° video.
Figure 2:
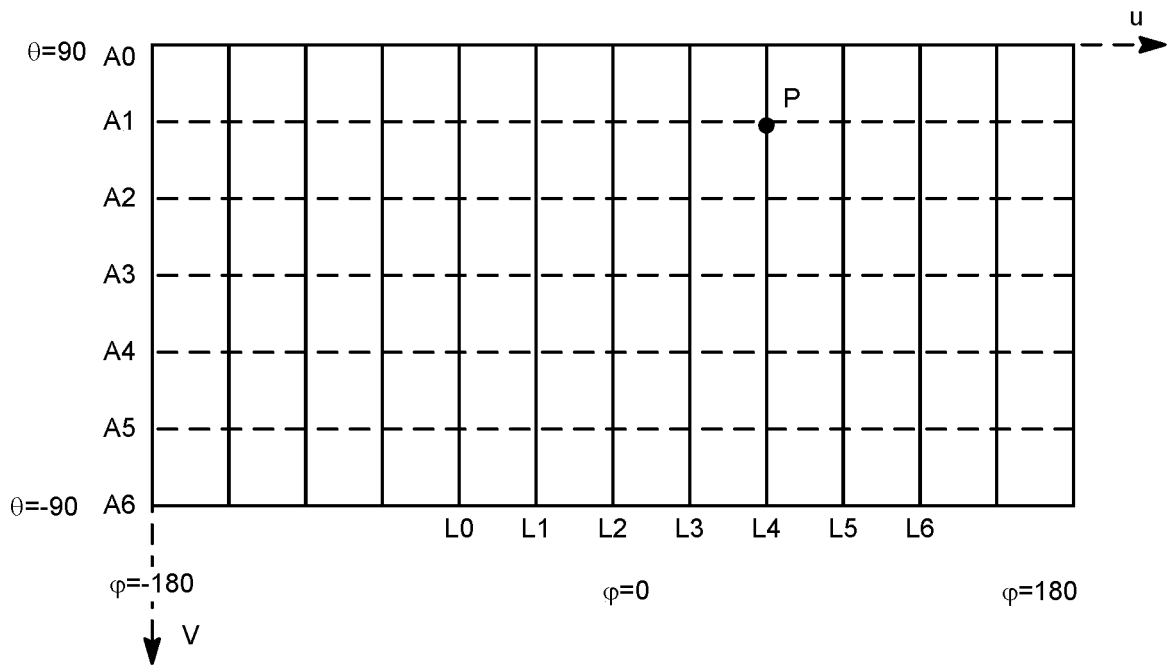

A 360° video may be captured and/or rendered on a sphere (e.g., to give the user the ability to choose an arbitrary viewport). A spherical video format may not be delivered directly using conventional video codecs. A 360° video (e.g., such as a spherical video) may be compressed by projecting spherical video onto a 2D plane using a projection method. The projected 2D video may be coded (e.g., using conventional video codecs). An example of the projection method may include an equirectangular projection. FIG. 2 depicts an example equirectangular projection for a 360° video. For example, an equirectangular projection method may use one or more of the following equations to map a first point P with coordinate (θ, φ) on a sphere to a second point P with coordinate (u, v) on a 2D plane, $$u=\phi/(2*pi)+0.5 \qquad (1)$$

$$v=0.5-\theta/(pi) \qquad (2)$$

Figure 3:
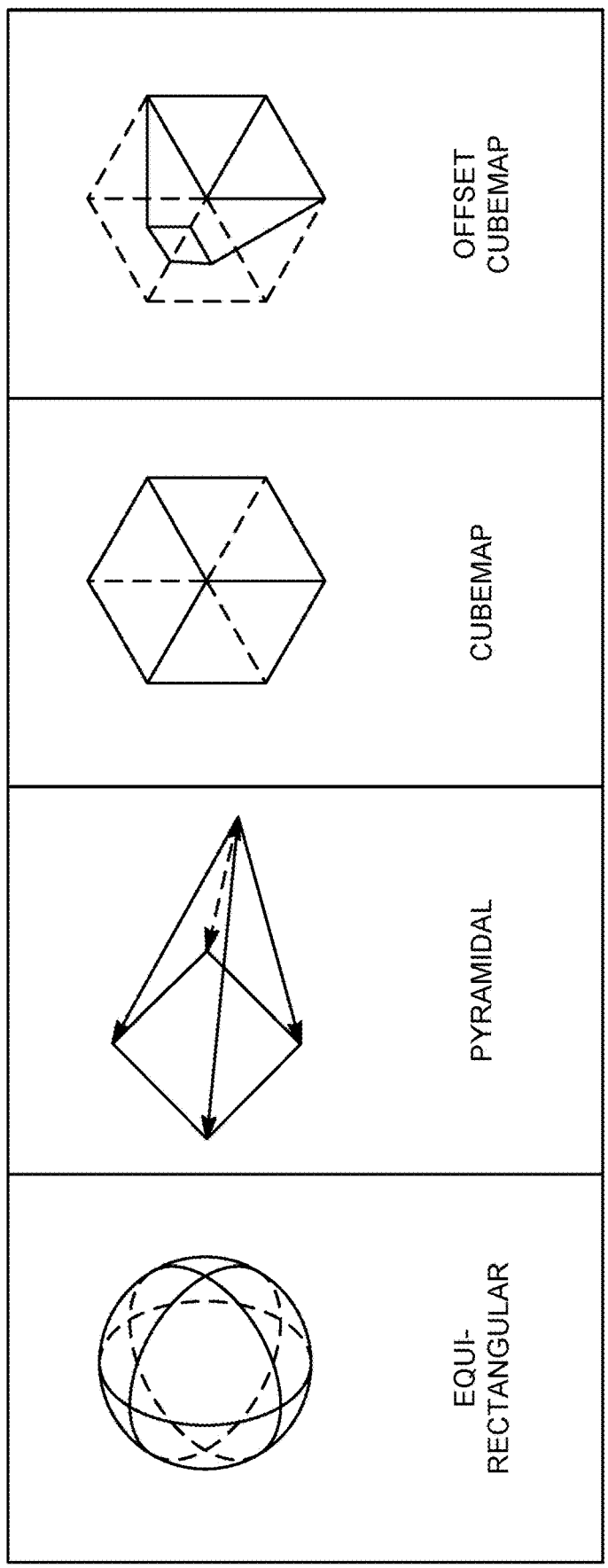
FIG. 3 depicts example 360° video mappings.

FIG. 3 depicts example 360° video mappings. For example, one or more other projection methods (e.g., mappings) may be used to convert 360 video to 2D planar video (e.g., in order to reduce the bandwidth requirement, alternative). For example, the one or more other projection methods may include a pyramid-map, a cube-map, and/or an offset cube-map. The one or more other projection methods may be used to represent the spherical video with less data.

A viewport-specific representation may be used. One or more of the projection methods shown in FIG. 3, for example, cube-map and/or pyramidal projection, may provide uneven quality representations for different viewports (e.g., some viewports may be represented in a higher quality than other view/ports). Multiple versions of the same video with different target viewports may be generated and/or stored at the server side (e.g., to support all viewports of the spherical video). For example, in Facebook's implementation of VR video delivery, the offset cube-map format shown in FIG. 3 may be used. The offset cube-map may provide a highest resolution (e.g., highest quality) to the front viewport, a lowest resolution (e.g., lowest quality) to the back view, and an intermediate resolution (e.g., intermediate quality) to one or more side views. A server may store multiple versions of the same content (e.g., to accommodate a client request for different viewports of the same content). For example, a total of 150 different versions (e.g., 30 viewports times 5 resolutions for each viewport) of the same content. During delivery (for example, streaming), the client may request a specific version that corresponds to its current viewport. The specific version may be delivered by the server.

In order to describe the various projection methods that may be used to represent 360 video and/or other non-conventional video formats (e.g., cylinder video that may be used in panoramic video representation), ISO/IEC/MPEG may define an Omnidirectional Media Application Format (OMAF). The OMAF file format metadata for the projection methods described herein may include support for projection metadata for video onto sphere, cube, cylinder, pyramid, and/or the like. Table 1 may show a syntax example of OMAF to support projection methods such as squished sphere, cylinder, and pyramid.

TABLE 1

Omnidirectional media texture mapping metadata

```
aligned(8) class OmnidirectionalMediaTextureMappingSampleEntry
extends MetadataSampleEntry ('omtm'){
    unsigned int(1)    is_stereoscopic;
    unsigned int(1)    is_default_front;
    unsigned int(6)    reserved;
    if ( is_sterescopic )
        unsigned int(8)    stereoscopic_type;
    unsigned int(8)    geometry_type;
    if ( geometry_type == Squished Sphere ){
        unsigned int (16) squish_start_pitch_top;
        unsigned int (16) squish_start_pitch_bottom;
        unsigned int (8) squish_ratio_top;
        unsigned int (8) squish_ratio_bottom;
    }
    if ( geometry_type == cylinder )
    unsigned int(8) radius;
        if ( geometry_type == pyramid )
    unsigned int(8) pyramid_height;
        if ( !is_default_front ) {
            unsigned int(16)center_pitch;
            unsigned int(16)center_yaw;
        }
}
```

HTTP streaming has become a dominant approach in commercial deployments. For instance, streaming platforms such as Apple's HTTP Live Streaming (HLS), Microsoft's Smooth Streaming (SS), and/or Adobe's HTTP Dynamic Streaming (HDS) may use HTTP streaming as an underlying delivery method. A standard for HTTP streaming of multimedia content may enable a standard-based client to stream content from any standard-based server (e.g., thereby enabling interoperability between servers and clients of different vendors). MPEG Dynamic Adaptive Streaming over HTTP (MPEG-DASH) may be a universal delivery format that provides end users with the best possible video experience by dynamically adapting to changing network conditions. DASH may be built on top of the HTTP/TCP/IP stack. DASH may define a manifest format, Media Presentation Description (MPD), and segment formats for ISO Base Media File Format and MPEG-2 Transport Streams.

Dynamic HTTP streaming may be associated with various bitrate alternatives of the multimedia content to be available at the server. The multimedia content may include several media components (e.g., audio, video, text), each of which may have different characteristics. In MPEG-DASH, the characteristics may be described by a Media Presentation Description (MPD).

Figure 4:
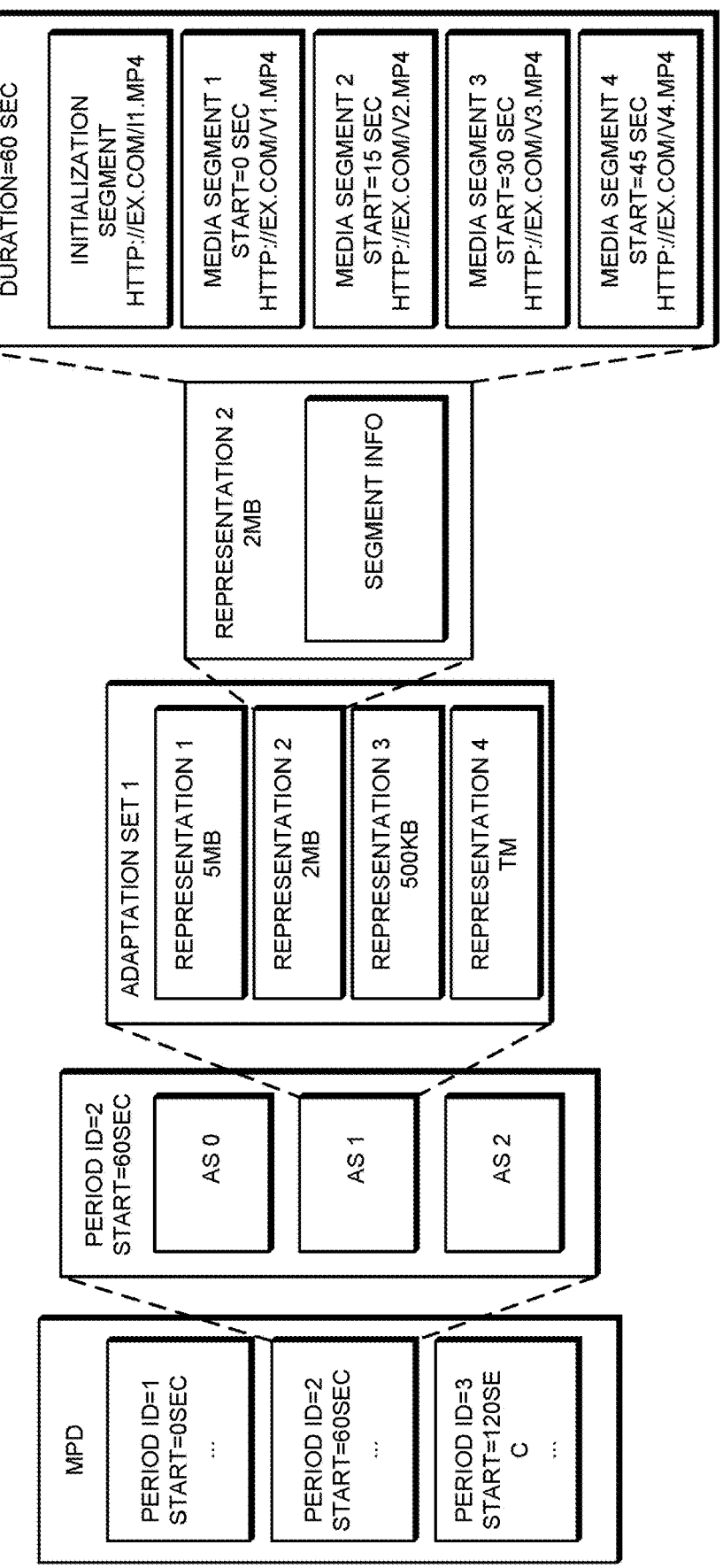
FIG. 4 depicts an example media presentation description (MPD) hierarchical data model.

The MPD may be an XML document that includes metadata necessary for a DASH Client to construct appropriate HTTP-URLs to access video segments (e.g., as described herein) in an adaptive manner during streaming sessions. FIG. 4 depicts an example media presentation description (MPD) hierarchical data model. The MPD may describe a sequence of Periods, where a consistent set of encoded versions of the media content components does not change during a Period. A Period may have a starting time and duration. A Period may be composed of one or more adaptation sets (e.g., AdaptationSet).

An AdaptationSet may represent a set of encoded versions of one or several media content components sharing one or more identical properties (e.g., such as the language, the media type, the picture aspect ratio, the role, the accessibility, the viewpoint, and/or the rating property). For instance, a first AdaptationSet may include different bitrates of the video component of the same multimedia content. A second AdaptationSet may include different bitrates of the audio component (e.g., lower quality stereo and/or higher quality surround sound) of the same multimedia content. An AdaptationSet may include multiple Representations.

A Representation may describe a deliverable encoded version of one or several media components, varying from other representations by bitrate, resolution, number of channels, and/or other characteristics. A representation may include one or more segments. One or more attributes of a Representation element (e.g., such as @id, @bandwidth, @qualityRanking, and @dependencyId) may be used to specify one or more properties of the associated Representation.

A Segment may be the largest unit of data that can be retrieved with a single HTTP request. A segment may have a URL (e.g., an addressable location on a server). A segment may be downloaded using HTTP GET or HTTP GET with byte ranges.

A DASH client may parse a MPD XML document. The DASH client may select a collection of AdaptationSets suitable for its environment, for example, based on information provided in the AdaptationSet elements. Within an AdaptationSet, the client may select a Representation. The client may select the Representation based on the value of @bandwidth attribute, client decoding capabilities, and/or client rendering capabilities. The client may download an initialization segment of the selected Representation. The client may access content (e.g., by requesting entire Segments or byte ranges of Segments). When the presentation has started, the client may continue consuming the media content. For example, the client may request (e.g., continuously request) Media Segments and/or parts of Media Segments during the presentation. The client may play content according to a media presentation timeline. The client may switch from a first Representation to a second representation, based on updated information from the client's environment. The client may play the content continuously across two or more Periods. When the client is consuming media contained in the Segments towards the end of the announced media in the Representation, the Media Presentation may be terminated, a Period may be started, and/or the MPD may be re-fetched.

The MPD descriptor element, Descriptor, may be provided to the application (e.g., to instantiate one or more description elements with the appropriate scheme information). One or more Descriptors (e.g., such as content protection, role, accessibility, rating, viewpoint, frame packing, and/or UTC timing descriptor) may include a @schemeIdUri attribute to identify the relative scheme.

A supplemental property descriptor (SupplementalProperty) may include metadata that may be used by the DASH client for optimizing processing.

An essential property descriptor (EssentialProperty) may include metadata for processing the containing element.

A Role MPD element may use a @schemeIdUri attribute to identify the role scheme employed to identify the role of the media content component. One or more Roles may define and/or describe one or more characteristics and/or structural functions of media content components. An Adaptation Set and/or a media content component may have multiple assigned roles (e.g., even within the same scheme).

MPEG-DASH may provide a spatial relationship description (SRD) scheme. The SRD scheme may express a spatial relationship of a video representing a spatial part of another full-frame video in two MPD elements (e.g., AdaptationSet and SubRepresentation). The SupplementalProperty and/or EssentialProperty descriptors with @schemeIdURI equal to "urn:mpeg:dash:srd:2014" may be used to provide spatial relationship information associated with the AdaptationSet and/or SubRepresentation. An attribute @value of the SupplementalProperty and/or EssentialProperty elements may provide one or more values for SRD parameters such as source_id, object_x, object_y, object_width, object_height, total_width, total_height, and/or spatial_set_id. The value and the semantics of the SRD parameters may be defined as shown in Table 2.

TABLE 2

EssentialProperty and/or SupplementalProperty attributes for the SRD scheme

| EssentialProperty @value and/or SupplementalProperty @value parameter | Description |
| --- | --- |
| source_id | a non-negative integer in decimal representation that may provide the identifier for the source of the content |
| object_x | a non-negative integer in decimal representation that may express the horizontal position of the top-left corner of the Spatial Object in arbitrary units |
| object_y | a non-negative integer in decimal representation that may express the vertical position of the top-left corner of the Spatial Object in arbitrary units |
| object_width | a non-negative integer in decimal representation that may express the width of the Spatial Object in arbitrary units |
| object_height | a non-negative integer in decimal representation that may express the height of the Spatial Object in arbitrary units |
| total_width | a non-negative integer in decimal representation that may express the width of the reference space in arbitrary units. At a Period and/or for a given source_id value, one or more of the following rules may apply: At least one descriptor may provide a value for the total_width parameter. If two or more descriptors provide different total_width values, all other descriptors may explicitly provide the value of total_width. If the total width value is provided in only one descriptor, all other descriptors may be assumed to use the total_width value. The value of total_width may be defined such that, for a descriptor using the value of total_width, the sum of object_x and object_width is smaller or equal to the total_width. When the value total_width is present, the value total_height may be present. |
| total_height | a non-negative integer in decimal representation that may express the height of the reference space in arbitrary units. At each Period and/or for a given source_id value, one or more of the following rules may apply: At least one descriptor may provide a value for the total_height parameter. If two or more descriptors provide different total_height values, all other descriptors may explicitly provide the value of total_height. If the total_height value is provided in only one descriptor, all other descriptors may be assumed to use the total_height value. The value of total height may be defined such that, for each descriptor using the value of total_height, the sum of object_y and object_height is smaller or equal to the total_height. When the value total_height is present, the value total_width may be present. |
| spatial_set_id | a non-negative integer in decimal representation that may provide an identifier for a group of Spatial Objects. When not present, the Spatial Object associated to this descriptor may not belong to any spatial set and/or no spatial set information may be given. |

TABLE 2-continued

EssentialProperty and/or SupplementalProperty attributes for the SRD scheme

| EssentialProperty @value and/or SupplementalProperty @value parameter | Description |
|---|---|
| | When the value of spatial_set_id is present, the value of total_width and/or total_height may be present. |

Figure 5:
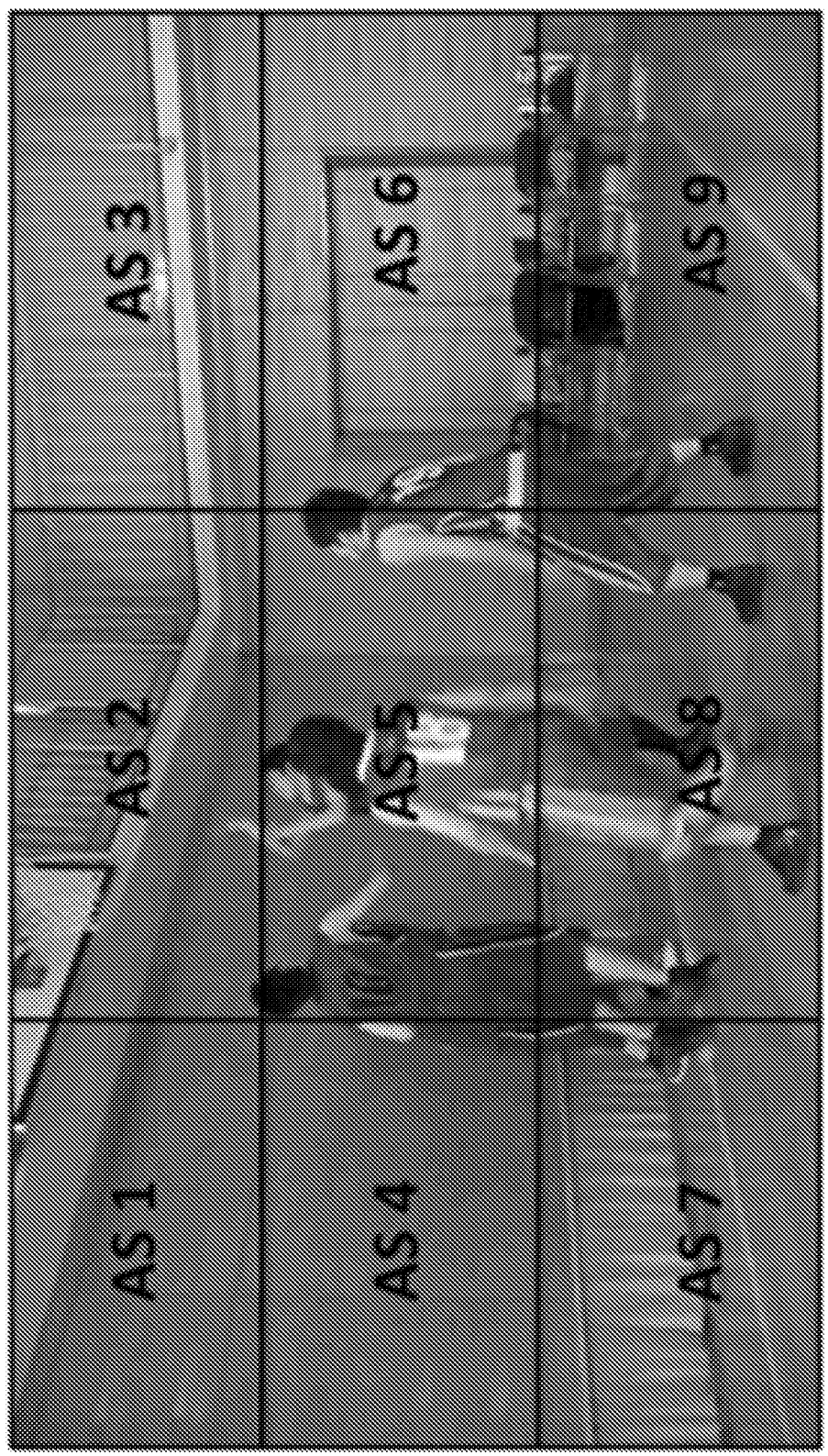
FIG. 5 depicts an example Dynamic Adaptive Streaming over HTTP (DASH) spatial relationship description (SRD) for a video.

FIG. 5 depicts an example DASH SRD video. The SRD may express that a video stream represents a spatial part of a full-frame video. The spatial part may be a tile and/or a region of interest (ROI) of the full-frame video. An SRD may describe the video stream in terms of the spatial part's position (object_x, object_y) and/or size (object_width, object_height) relative to the full-frame video (total_width, total_height). The SRD description may provide flexibility for the client in terms of adaptation. An SRD-aware DASH client may select a full-frame representation and/or a spatial part of the full-frame representation using one or more SRD annotations. Using the one or more SRD annotations to select the full-frame representation or a spatial part may save bandwidth and/or client-side computations, e.g., avoiding full-frame fetching, decoding, and/or cropping. Using the one or more SRD annotations to determine which representation to select may increase the quality of a given spatial part (e.g., the Region of Interest or ROI) of the full-frame video, for example, after a zoom. For example, the client may request a first video stream that corresponds to the ROI spatial part with higher quality and the client may request a second video stream that does not correspond to the ROI with lower quality, without increasing the overall bitrate.

Table 3 is an MPD example supporting SRD for the scenario as shown in FIG. 5, where each tile has a resolution of 1920×1080 and the whole frame has a resolution of 5760×3240 with 9 tiles.

TABLE 3

MPD example with SRD elements

```
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"
[...]>
<Period>
  <!-9 tiles -->
  <AdaptationSet [...]>
    <EssentialProperty schemeIdUri="urn:mpeg:dash:srd:2014"
      value="1, 0, 0, 1920, 1080, 5760, 3240"/>
    <Representation id="1" bandwidth="5000000">
      <BaseURL>tile1.mp4</BaseURL>
    </Representation>
  </AdaptationSet>
  <AdaptationSet [...]>
    <EssentialProperty schemeIdUri="urn:mpeg:dash:srd:2014"
      value="1, 1920, 0, 1920, 1080"/>
    <Representation id="2" bandwidth="5000000">
      <BaseURL>tile2.mp4</BaseURL>
    </Representation>
  </AdaptationSet>
  <AdaptationSet [...]>
    <EssentialProperty schemeIdUri="urn:mpeg:dash:srd:2014"
      value="1, 3840, 0, 1920, 1080"/>
    <Representation id="3" bandwidth="5000000">
      <BaseURL>tile3.mp4</BaseURL>
    </Representation>
```

TABLE 3-continued

MPD example with SRD elements

```
  </AdaptationSet>
  <AdaptationSet [...]>
    <EssentialProperty schemeIdUri="urn:mpeg:dash:srd:2014"
      value="1, 0, 1080, 1920, 1080"/>
    <Representation id="4" bandwidth="5000000">
      <BaseURL>tile4.mp4</BaseURL>
    </Representation>
  </AdaptationSet>
  <!--Legacy clients will end up with a valid MPD after processing
  unknown SupplementalProperty or EssentialProperty SRD descriptors. It
  will contain only this AdaptationSet since SupplementalProperty is used
  here. -->
  <AdaptationSet [...]>
    <SupplementalProperty schemeIdUri="urn:mpeg:dash:srd:2014"
      value="1, 1920, 1080, 1920, 1080"/>
    <Representation id="5" bandwidth="5000000">
      <BaseURL>tile5.mp4</BaseURL>
    </Representation>
  </AdaptationSet>
  <AdaptationSet [...]>
    <EssentialProperty schemeIdUri="urn:mpeg:dash:srd:2014"
      value="1, 3840, 1080, 1920, 1080"/>
    <Representation id="6" bandwidth="5000000">
      <BaseURL>tile6.mp4</BaseURL>
    </Representation>
  </AdaptationSet>
  <AdaptationSet [...]>
    <EssentialProperty schemeIdUri="urn:mpeg:dash:srd:2014"
      value="1, 0, 2160, 1920, 1080"/>
    <Representation id="7" bandwidth="5000000">
      <BaseURL>tile7.mp4</BaseURL>
    </Representation>
  </AdaptationSet>
  <AdaptationSet [...]>
    <EssentialProperty schemeIdUri="urn:mpeg:dash:srd:2014"
      value="1, 1920, 2160, 1920, 1080"/>
    <Representation id="8" bandwidth="5000000">
      <BaseURL>tile8.mp4</BaseURL>
    </Representation>
  </AdaptationSet>
  <AdaptationSet [...]>
    <EssentialProperty schemeIdUri="urn:mpeg:dash:srd:2014"
      value="1, 3840, 2160, 1920, 1080"/>
    <Representation id="9" bandwidth="5000000">
      <BaseURL>tile9.mp4</BaseURL>
    </Representation>
  </AdaptationSet>
<Period>
</MPD>
```

Figure 6:
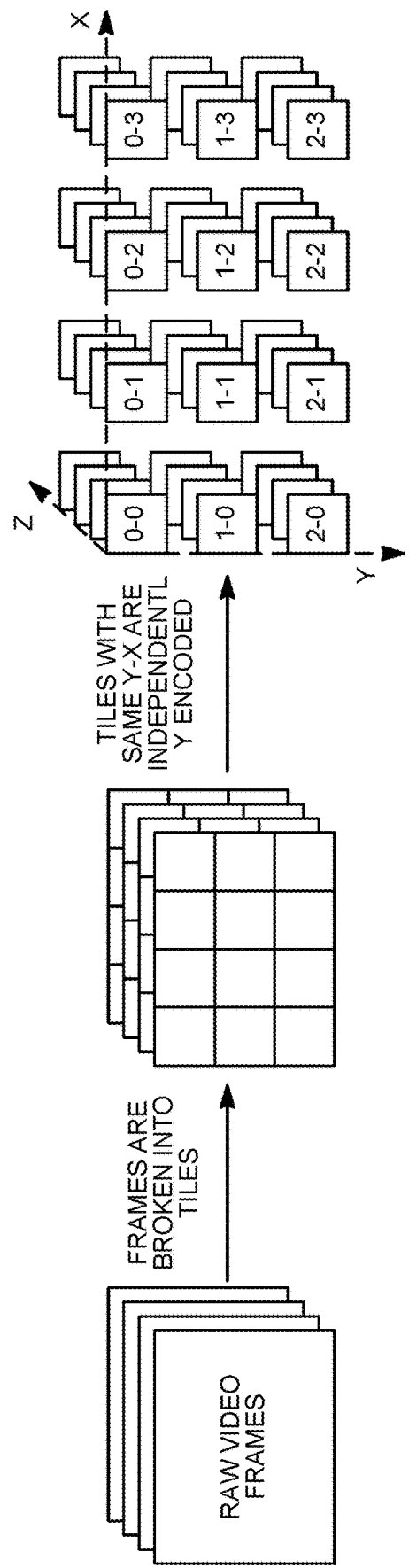
FIG. 6 depicts an example tile based video partitioning.

FIG. 6 depicts an example tile based video partitioning. A 2D frame may be partitioned into one or more tiles, as shown in FIG. 6. Given MPEG-DASH SRD support, tile based adaptive streaming (TAS) may be used to support features like zooming and panning in a large panorama, spatial resolution enhancement, and/or server-based mosaic service. An SRD aware DASH client may use one or more SRD annotations to select a full-frame representation or a tile representation. Using the one or more SRD annotations to determine whether to select the full-frame representation of the tile representation may save bandwidth and/or client-side computations (e.g., avoiding full-frame fetching, decoding, and/or cropping).

Figure 7:
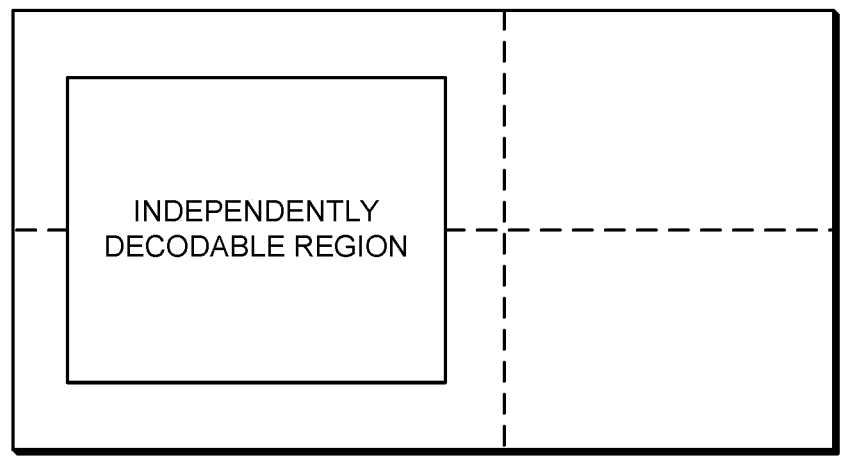
FIG. 7 depicts an example temporal motion constrained tile set.

FIG. 7 depicts an example temporal motion-constrained tile set. A frame may be encoded into a bitstream that includes a number of temporal motion-constrained tile sets as specified in HEVC. Each of the temporal motion-constrained tile sets may be decoded independently. As shown in FIG. 7, two or more left tiles may form a motion-constrained tile set that can be decoded independently (e.g., without decoding the full picture).

360° video content may be delivered via progressive download or DASH adaptive streaming, which are primarily HTTP based streaming solutions. Dynamic streaming for 360° video based on UDP instead of HTTP has been proposed (e.g., by Facebook) to reduce latency.

Representing 360 video with sufficient quality may require the 2D projection to have a high resolution. When a full 2D layout is coded in high quality, the resulting bandwidth may be too high for effective delivery. Some mappings and/or projections may be used to reduce the amount of data by allowing different portions of the 360 video to be represented in different qualities. For example, a front view (e.g., viewport) may be represented in a high quality and a back (e.g., opposite) view may be represented in a low quality. One or more other views may be represented in one or more intermediate qualities. The offset cube-map and the pyramidal map, shown in FIG. 3, may be examples of mappings and/or projections that represent different portions of the 360 video in different qualities. Though the pyramidal map may reduce the number of pixels and/or save bitrate for each viewport, multiple viewport versions may handle different viewing positions that the client may request. When compared to delivering the entire 360 video, the viewport-specific representation and/or delivery may have higher latency adapting when the user changes viewing positions. For example, using the offset cube-map representation, the video quality may degrade when the user's head position rotates 180 degrees.

Figure 8:
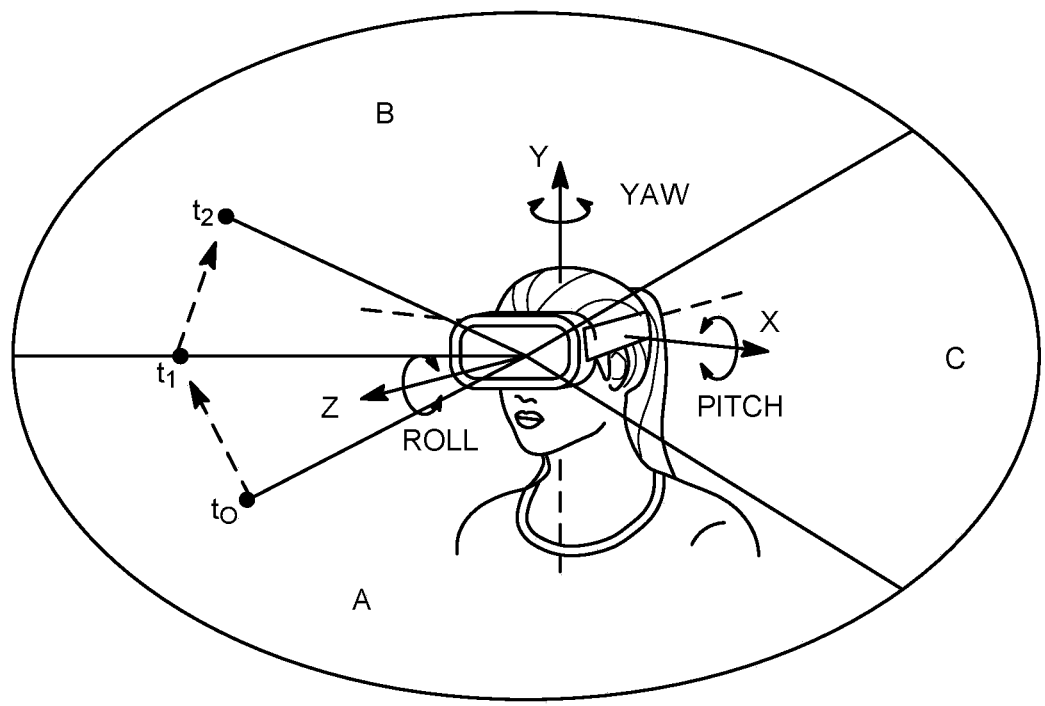
FIG. 8 depicts an example 360° video streaming quality degradation.
Figure 8:
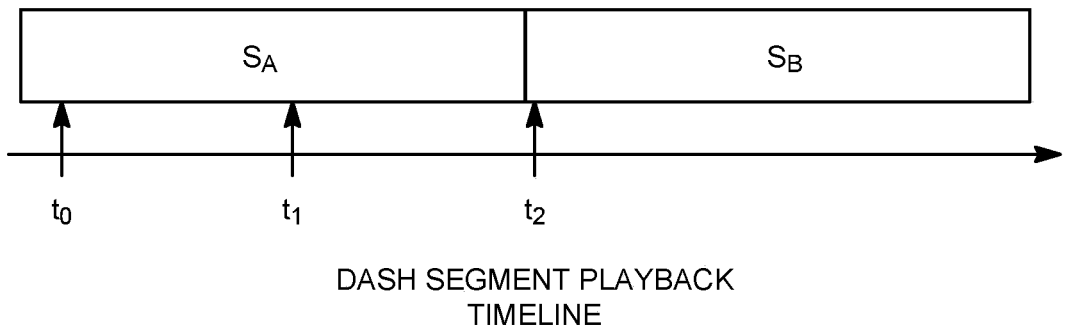

FIG. 8 depicts an example 360 video streaming quality degradation. DASH segment length and/or client buffer size may affect viewing quality. Longer segment lengths may result in higher coding efficiency. The longer segment lengths may not adapt to viewport changes as quickly. As shown in FIG. 8, a user may have three possible viewports of a 360 video (e.g., A, B and C). One or more (e.g., 3) segment types, $S_A$, $S_B$ and $S_C$, may be associated with the 360 video. Each of the one or more segment types may carry a higher quality of the corresponding viewport and a lower quality of the other viewports. The user may pan from viewport A to viewport B at time $t_1$ during the playback of segment $S_A$ that carries a higher quality video for viewport A and a lower quality video for viewports B and C. The user may have to watch lower quality viewport B before switching to the next segment ($S_B$), which carries higher quality video for viewport B and lower quality video for viewports A and C. Such negative user experience may be resolved with shorter segment lengths. Shorter segment lengths may reduce coding efficiency. The user may have to watch lower quality video when the user's streaming client logic pre-downloads too many segments based on a previous viewport. To prevent the user's streaming client from pre-downloading too many segments based on the previous viewport, the streaming buffer size may be reduced. A smaller streaming buffer size may affect streaming quality adaptation, for example, by causing more frequent buffer underflow.

Viewport adaptive 360° video streaming may include viewport enhancement based delivery and/or layer based delivery.

Figure 9:
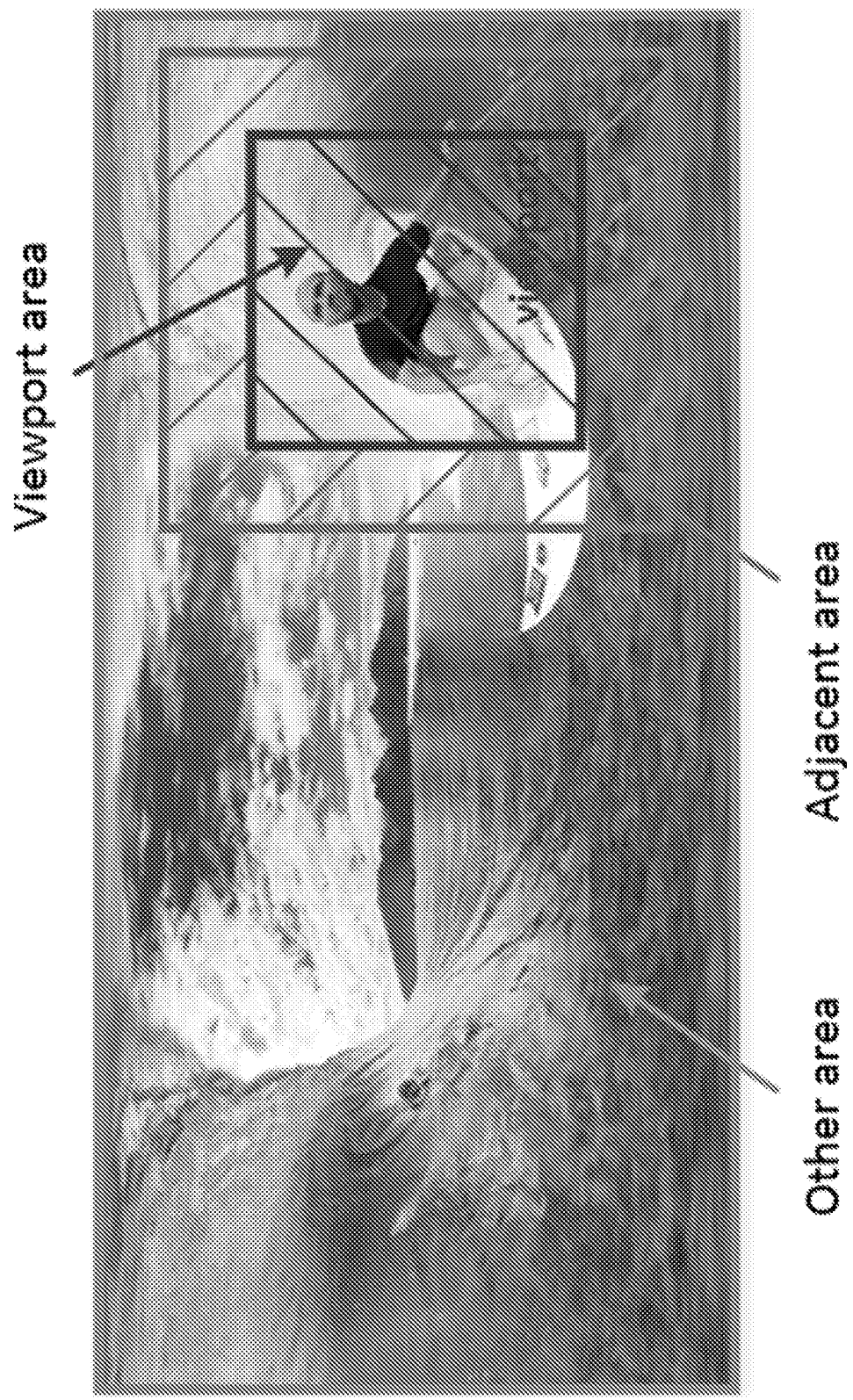
FIG. 9 depicts an example viewport area with an associated adjacent area.
Figure 10A:
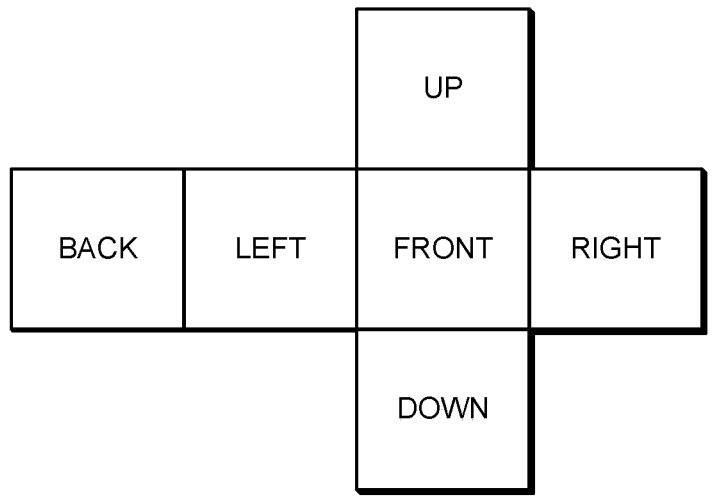
FIGS. 10A-10D depict example cube-map layouts.
Figure 10B:
Figure 10C:
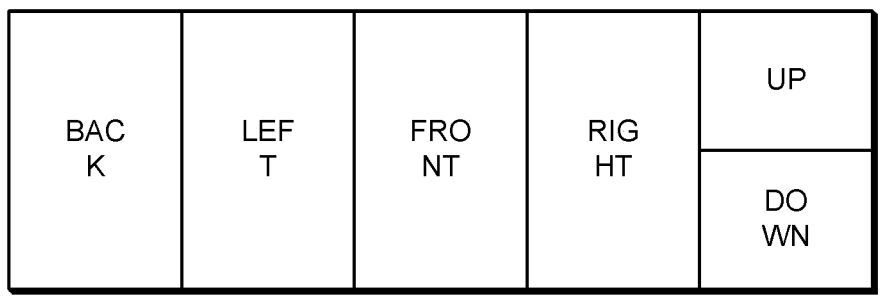
Figure 10D:
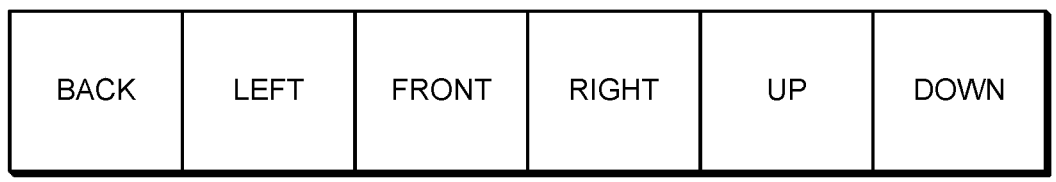

Efficient 360 video streaming may consider both bitrate adaptation and viewport adaptation. Viewport enhancement based 360° video delivery may include encoding one or more identified viewports of a 360 video frame in a high quality. For example, a viewport-based bit allocation may be performed during encoding. The viewport-based bit allocation may assign a bigger portion of the bits to the one or more viewports and/or assign a correspondingly reduced amount of bits to the other areas. FIG. 9 depicts an example viewport area with an associated adjacent area. A viewport area, an adjacent area, and other area may be determined for a 360° video frame.

A bitrate weight for the viewport area may be defined as $\alpha$. The bitrate weight for the adjacent area may be defined as $\beta$. The bitrate weight for the other area may be defined as $\gamma$. One or more of the following equations may be used to determine the target bitrate for each area.

$$\alpha+\beta+\gamma=1 \qquad (3)$$

$$BR_{HQ}=R\times\alpha \qquad (4)$$

$$BR_{MQ}=R\times\beta \qquad (5)$$

$$BR_{LQ}=R\times\gamma \qquad (6)$$

Where R may represent a constant coding bitrate for the entire 360° video, $BR_{HQ}$ may represent a coding bitrate for the target viewports area, $BR_{MQ}$ may represent a coding bitrate for the viewport adjacent area and/or $BR_{LQ}$ may represent the coding bitrate for the other area.

In equation (3), the values of $\alpha$, $\beta$, and $\gamma$ may add up to 1, which may mean that the overall bitrate is kept the same. For example, bits may only be redistributed among the different areas (e.g., viewport, adjacent areas, and other areas). At an overall bitrate of R, the same video may be encoded into different versions. Each of the different versions may be associated with a different viewport quality level. Each of the different viewport quality levels may correspond to a different value of $\alpha$.

The overall bitrate R may not be kept the same. For example, the viewport area, the adjacent area, and the other area may be encoded to a target quality level. In this case, the representation bitrate for each of the areas may be different.

The projection methods described herein, (e.g., such as offset cube-map, pyramid map) may enhance the quality of one or more target viewports and/or reduce the quality of other areas of the video.

At the server side, an AdaptationSet may include multiple Representation elements. A Representation of a 360 video stream may be coded in a specific resolution and/or at a specific bitrate. A Representation may be associated with one or more specific quality enhanced viewport(s). A Viewport Relationship Description (VRD) may specify one or more corresponding viewport spatial coordinate relationships. The SupplementalProperty and/or EssentialProperty descriptors with @schemeIdUri equal to "urn:mpeg:dash:viewport:2d:2016" may be used to provide a VRD associated with the AdaptationSet, Representation, and/or Sub-Representation elements.

The @value of the SupplementalProperty and/or EssentialProperty elements using the VRD scheme may be a comma separated list of values for viewport description parameters. Each AdaptationSet, Representation, and/or Sub-Representation may include one or more VRDs to represent one or more enhanced viewports. The properties of an enhanced viewport may be described by the VRD parameters as shown in Table 4.

TABLE 4

Viewport relationship description scheme

| VRD scheme | Description |
| --- | --- |
| @schemeIdUri | urn:mpeg:dash:viewport:2d:2016 |
| @value | A comma-separate list of values for one or more of the following fields: viewport_id, viewport_x, viewport_y, viewport_width, viewport_height, full_width, full_height and/or viewport_quality |
| viewport_id | A non-negative integer in decimal representation that may provide an identifier for an identified viewport |
| viewport_x | A non-negative integer in decimal representation that may express the horizontal position of the top-left corner of the identified viewport |
| viewport_y | A non-negative integer in decimal representation that may express the vertical position of the top-left corner of the identified viewport |
| viewport_width | A non-negative integer in decimal representation that may express the width of the identified viewport |
| viewport_height | A non-negative integer in decimal representation that may express the height of the identified viewport |
| full_width | A non-negative integer in decimal representation that may express the width of the entire 360 video. If not present, the value may be inferred to be the same as the value of viewport_width. |
| full_height | A non-negative integer in decimal representation that may express the height of the entire 360 video. If not present, the value may be inferred to be the same as the value of viewport_height. |
| viewport_quality | A non-negative integer that may express a relative quality of the identified viewport, for example, on a scale of 0 to N − 1 (e.g. N = 5 or 10) |

Table 5 provides a MPD example of a 4k 360 video. The AdaptationSet may be annotated with two SupplementalProperty descriptors with VRD scheme identifier "urn:mpeg:dash:viewport:2d:2016". A first descriptor may specify an enhanced 320×640 viewport #1 at (150,150) with quality level 3. A second descriptor may specify 640×960 viewport #2 at (1000, 1000) with quality level 5. Both viewports may represent spatial parts of a 4096×2048 full-frame 360° video. There may be two Representations, a first Representation may be full resolution and a second Representation may be half resolution. The viewport position and/or size of a Representation may be identified based on the values of VRD attributes @full_width and/or @full_height and/or the value of Representation attributes @width and/or @height. For example, viewport #1 in full resolution Representation (e.g., @width=4096 and @height=2048) may be at (150,150) with the size 320×640, while viewport #1 in half resolution Representation (e.g., @width=2048 and @height=1024) may be at (75,75) with the size 160×320. Depending on one or more capabilities of the user's WTRU, the half resolution video may be scaled up to the full resolution.

TABLE 5

MPD example for the viewport description scheme

```
<?xml version="1.0" encoding="UTF-8"?>
<MPD
 xmlns="urn:mpeg:dash:schema:mpd:2011"
 type="static"
 mediaPresentationDuration="PT10S"
 minBufferTime="PT1S"
 profiles="urn:mpeg:dash:profile:isoff-on-demand:2011">
 <ProgramInformation>
  <Title>Example of a DASH Media Presentation Description using
Viewport Relationship Description to indicate viewports of a 360 video
</Title>
 </ProgramInformation>
 <Period>
  <!-- Main Video -->
  <AdaptationSet segmentAlignment="true" subsegmentAlignment=
"true" subsegmentStartsWithSAP="1">
   <Role schemeIdUri="urn:mpeg:dash:role:2011" value="main"/>
   <SupplementalProperty schemeIdUri="urn:mpeg:dash:viewport:2d:
2016" value="0,150,150,320,640,4096,2048,3"/>
   <SupplementalProperty schemeIdUri="urn:mpeg:dash:viewport:2d:
2016" value="1,1000,1000,640,960,4096,2048,5"/>
   <Representation mimeType="video/mp4" width="2048" height=
"1024" bandwidth="226597" startWithSAP="1">
    <BaseURL> half_360 video.mp4</BaseURL>
   </Representation>
   <Representation mimeType="video/mp4" width="4096" height=
"2048" bandwidth="1055223" startWithSAP="1">
    <BaseURL> full_360 video.mp4</BaseURL>
   </Representation>
  </AdaptationSet>
 </Period>
</MPD>
```

A projection (e.g., equirectangular, cube-map, cylinder, and pyramid) may be used to map the surface of a sphere video to a flat image for processing. One or more layouts may be available for a particular projection. For example, for the equirectangular and/or cube-map projection format, different layouts may be used. FIGS. 10A-10D depict example cube-map layouts. The cube-map layouts may include a cube layout, a 2×3 layout, a poles on the side layout, and/or a single row layout.

Figure 11A:
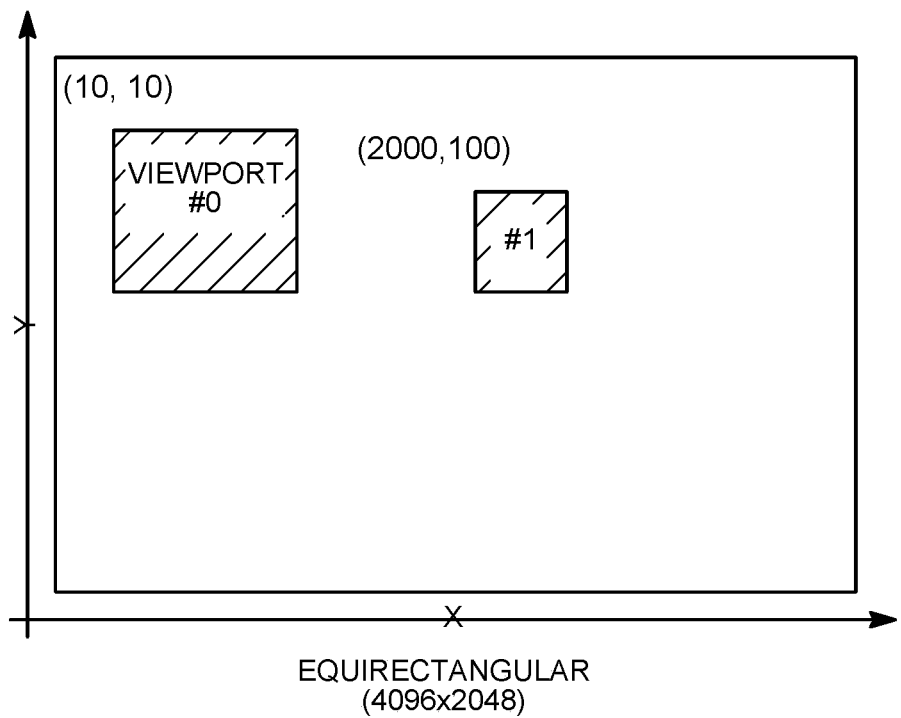
FIG. 11A depicts an example equirectangular coordinate viewport mapping.
Figure 11B:
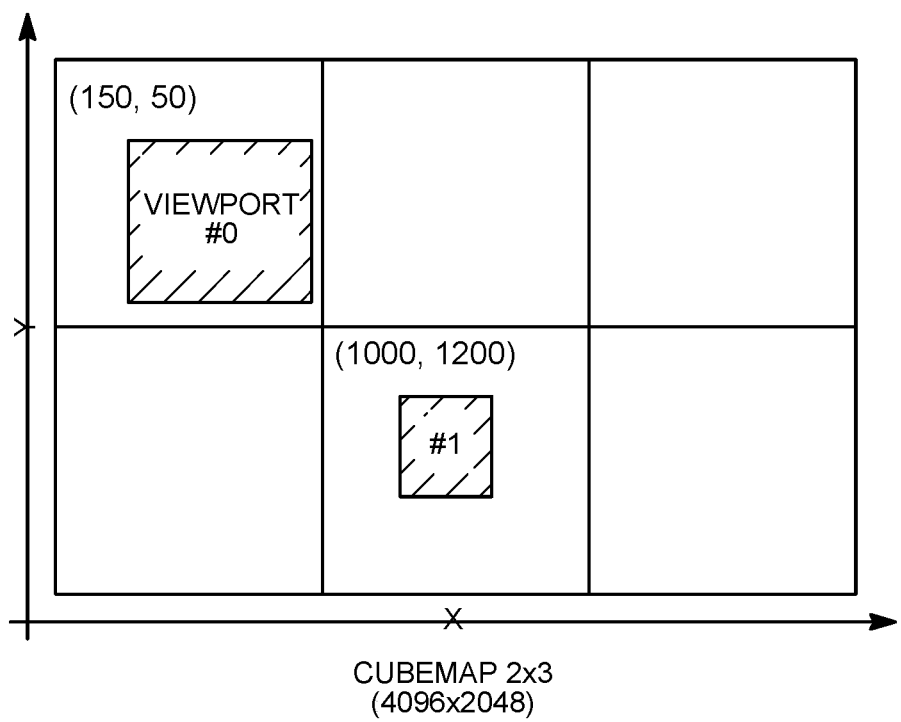
FIG. 11B depicts an example cube-map coordinate viewport mapping.

The VRD in Table 4 may be specified for a particular projection format, for example, equirectangular projection. The VRD in Table 4 may be specified for a particular projection and layout combination, for example, cube-map project and a 2×3 layout (e.g., layout B shown in FIG. 10B). The VRD in Table 4 may be extended to support a variety of projection formats and/or projection and layout combination formats at the same time, as shown in Table 6. The server may support a set of popular projection and/or projection and layout formats, for example, using the signalling syntax shown in Table 6. FIG. 11 depicts example viewport coordinates in equirectangular and cube-map. One or more (e.g., two) viewports of the 360 video may be identified. As shown, the coordinate values of a viewport may be different in equirectangular and cube-map projection formats.

The VRD may specify the one or more viewport(s) associated with the Representation element. Table 7 shows an MPD example where both equirectangular and cube-map Representations are provided and the corresponding VRD is signalled accordingly. One or more first VRDs (e.g., VRD@viewport_id=0, 1) may specify one or more properties of a viewport in one or more first Representations (e.g., Representation@id=0,1) that are in an equirectangular projection format. One or more second VRDs (VRD@viewport_id=2, 3) may specify one or more properties of the viewport in one or more second Representations (e.g., Representation@id=2, 3) that are in a cube-map projection format.

The VRD may specify one or more viewport(s) coordinates in one or more (e.g., all) common projection/layout formats (e.g., even though the associated Representation is in one projection/layout format). Table 8 shows an MPD example where the Representations of equirectangular projection are provided and the VRD of corresponding viewports for both equirectangular and cube-map are provided. For example, the projection and layout formats may be signalled at a Representation level as described herein.

The server may specify the viewports in different formats and/or may give the client the flexibility to choose an appropriate viewport (e.g., depending on the client's capability and/or technical specification). If the client cannot find a preferred format (e.g., either from the method specified in Table 4 or from the set of methods specified in Table), the client may convert one or more viewports from one of the specified formats into a format that it wants to use. For example, the one or more viewports may specified in the cube-map format but the client wants to use the equirectangular format. Based on the projection and/or layout description available in MPD, the client may derive a user orientation position from its gyroscope, accelerometer, and/or magnetometer tracking information. The client may convert the orientation position into a corresponding 2D position on a specific projection layout. The client may request the Representation with the identified viewport based on the value of one or more VRD parameters such as @viewport_x, @viewport_y, @viewport_width, and/or @viewport_height.

TABLE 6

Extended EssentialProperty@value and/or SupplementalProperty@value attributes for

| EssentialProperty @value and/or SupplementalProperty @value parameter | Description |
|---|---|
| viewport_id | A non-negative integer in decimal representation that may provide an identifier for an identified viewport |
| viewport_x | A non-negative integer in decimal representation that may express the horizontal position of the top-left corner of the identified viewport |
| viewport_y | A non-negative integer in decimal representation that may express the vertical position of the top-left corner of the identified viewport |
| viewport_width | A non-negative integer in decimal representation that may express the width of the identified viewport |
| viewport_height | A non-negative integer in decimal representation that may express the height of the identified viewport |
| full_width | A non-negative integer in decimal representation that may express the width of the entire 360 video. If not present, the value may be inferred to be the same as the value of viewport_width. |
| full_height | A non-negative integer in decimal representation that may express the height of the entire 360 video. If not present, the value may be inferred to be the same as the value of viewport_height. |
| viewport_quality | A non-negative integer that may express a relative quality of the identified viewport, for example, on a scale of 0 to N − 1 (e.g. N = 5 or 10) |
| projection | May specify the projection method used to project omnidirectional video into flat video frame in the form of a string. |
| layout | May specify the layout format in the form of a string. |

TABLE 7

MPD example #1 for the VRD

```
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <ProgramInformation>
    <Title>Example of a DASH Media Presentation Description using Viewport Relationship Description to indicate viewports of a 360 video</Title>
  </ProgramInformation>
  <Period>
    <!-- Equirectangular Video -->
    <AdaptationSet segmentAlignment="true" subsegmentAlignment="true" subsegmentStartsWithSAP="1">
      <Role schemeIdUri="urn:mpeg:dash:role:2011" value="main"/>
      <SupplementalProperty schemeIdUri="urn:mpeg:dash:viewport:2d:2016" value="0,10,10,720,1280,4096,2048,3,'equirectangular','regular'"/>
      <SupplementalProperty schemeIdUri="urn:mpeg:dash:viewport:2d:2016" value="1,2000,100,540,960,4096,2048,5,'equirectangular','regular'"/>
      <Representation @id=0 mimeType="video/mp4" codecs="avc1.42c01e" width="1920" height="1080" bandwidth="226597" startWithSAP="1">
        <BaseURL> full_video_HD.mp4</BaseURL>
      </Representation>
      <Representation @id=1 mimeType="video/mp4" codecs="avc1.42c033" width="4096" height="2048" bandwidth="1055223" startWithSAP="1">
        <BaseURL> full_360 video_4k.mp4</BaseURL>
      </Representation>
    </AdaptationSet>
    <!--Cubemap Video -->
    <AdaptationSet segmentAlignment="true" subsegmentAlignment="true" subsegmentStartsWithSAP="1">
      <Role schemeIdUri="urn:mpeg:dash:role:2011" value="main"/>
      <SupplementalProperty schemeIdUri="urn:mpeg:dash:viewport:2d:2016" value="2,150,50,720,1280,4096,2048,3,'cubemap','2x3'"/>
      <SupplementalProperty schemeIdUri="urn:mpeg:dash:viewport:2d:2016" value="3,1000,1200,540,960,4096,2048,5,'cubemap','2x3'"/>
      <Representation @id=2 mimeType="video/mp4" codecs="avc1.42c01e" width="1920" height="1080" bandwidth="226597" startWithSAP="1">
        <BaseURL> Cubemap_video_HD.mp4</BaseURL>
      </Representation>
      <Representation @id=3 mimeType="video/mp4" codecs="avc1.42c033" width="4096" height="2048" bandwidth="1055223" startWithSAP="1">
        <BaseURL> Cubemap_360 video_4k.mp4</BaseURL>
      </Representation>
    </AdaptationSet>
  </Period>
</MPD>
```

TABLE 8

MPD example #2 for the VRD

```
<?xml version="1.0" encoding="UTF-8"?>
<MPD
 xmlns="urn:mpeg:dash:schema:mpd:2011"
 type="static"
 mediaPresentationDuration="PT10S"
 minBufferTime="PT1S"
 profiles="urn:mpeg:dash:profile:isoff-on-demand:2011">
 <ProgramInformation>
   <Title>Example of a DASH Media Presentation Description using Viewport
Relationship Description to indicate viewports of a 360 video</Title>
 </ProgramInformation>
 <Period>
   <!-- Equirectangular Video -->
   <AdaptationSet segmentAlignment="true" subsegmentAlignment="true"
subsegmentStartsWithSAP="1">
     <Role schemeIdUri="urn:mpeg:dash:role:2011" value="main"/>
     <SupplementalProperty schemeIdUri="urn:mpeg:dash:viewport:2d:2016"
value="0,10,10,720,1280,4096,2048,3,'Equirectangular','regular'"/>
     <SupplementalProperty schemeIdUri="urn:mpeg:dash:viewport:2d:2016"
value="1,2000,100,540,960,4096,2048,5,'Equirectangular','regular'"/>
     <SupplementalProperty schemeIdUri="urn:mpeg:dash:viewport:2d:2016"
value="0,150,50,720,1280,4096,2048,3,'cubemap','2x3'"/>
     <SupplementalProperty schemeIdUri="urn:mpeg:dash:viewport:2d:2016"
value="1,1000,1200,540,960,4096,2048,5,'cubemap','2x3'"/>
     <Representation mimeType="video/mp4" codecs="avc1.42c01e" width="1920"
height="1080" bandwidth="226597" startWithSAP="1" projection="equirectangular">
       <BaseURL> full_video_HD.mp4</BaseURL>
     </Representation>
     <Representation mimeType="video/mp4" codecs="avc1.42c033" width="4096"
height="2048" bandwidth="1055223" startWithSAP="1" projection="equirectangular">
       <BaseURL> full_360 video_4k.mp4</BaseURL>
     </Representation>
   </AdaptationSet>
 </Period>
</MPD>
```

A general viewport descriptor, as shown in Table 9, may be provided. The general viewport descriptor may describe the viewport positions using spherical coordinates ($\theta, \phi$) as shown in FIG. 2, where $\theta$ may represent the inclination or polar angle, $\phi$ may represent the azimuthal angle, and/or a normalized radius may be 1.

SupplementalProperty and/or EssentialProperty descriptors with @schemeIdUri equal to "urn:mpeg:dash:viewport:sphere:2016" may be used to provide spherical coordinate based VRD associated with the AdaptationSet, Representation, and/or Sub-Representation elements. A region specified with the spherical coordinates may not correspond to a rectangular area on the 2D plane after projection. If the region does not correspond to a rectangular area on the 2D plane after projection, a bounding rectangle of the signalled region may be derived and/or used to specify the viewport.

The @value of the SupplementalProperty and/or EssentialProperty elements using the VRD may be a comma separated list of values for one or more viewport description parameters. Each AdaptationSet, Representation and/or Sub-Representation may include one or several VRD to represent one or more enhanced viewports. The properties of an enhanced viewport may be described by the parameters as shown in Table 9.

TABLE 9

Viewport relationship description in spherical coordinates

| EssentialProperty and/or SupplementalProperty parameter | Description |
|---|---|
| @schemeIdUri | urn:mpeg:dash:viewport:sphere:2016 |
| @value | A comma-separate list of values for one or more of the following fields: viewport_id, viewport_inc, viewport_az, viewport_delta_inc, viewport_delta_az, and/or viewport_quality |

TABLE 9-continued

Viewport relationship description in spherical coordinates

| EssentialProperty and/or SupplementalProperty parameter | Description |
|---|---|
| viewport_id | A non-negative integer in decimal representation that may provide an identifier for one or more viewports |
| viewport_inc | An integer in decimal representation measured in degrees or radian that may express the inclination of an identified viewport top-left position |
| viewport_az | An integer in decimal representation measured in degrees or radian that may express the azimuthal of the identified viewport top-left position |
| viewport_delta_inc | A non-negative integer in decimal representation measured in degrees or radian that may express the inclination range of the identified viewport |
| viewport_delta_az | A non-negative integer in decimal representation measured in degrees or radian that may express the azimuthal range of the identified viewport |
| viewport_quality | A non-negative integer that may express a relative quality of the identified viewport, for example, on a scale of 0 to N − 1 (e.g. N = 5 or 10) |

Figure 12:
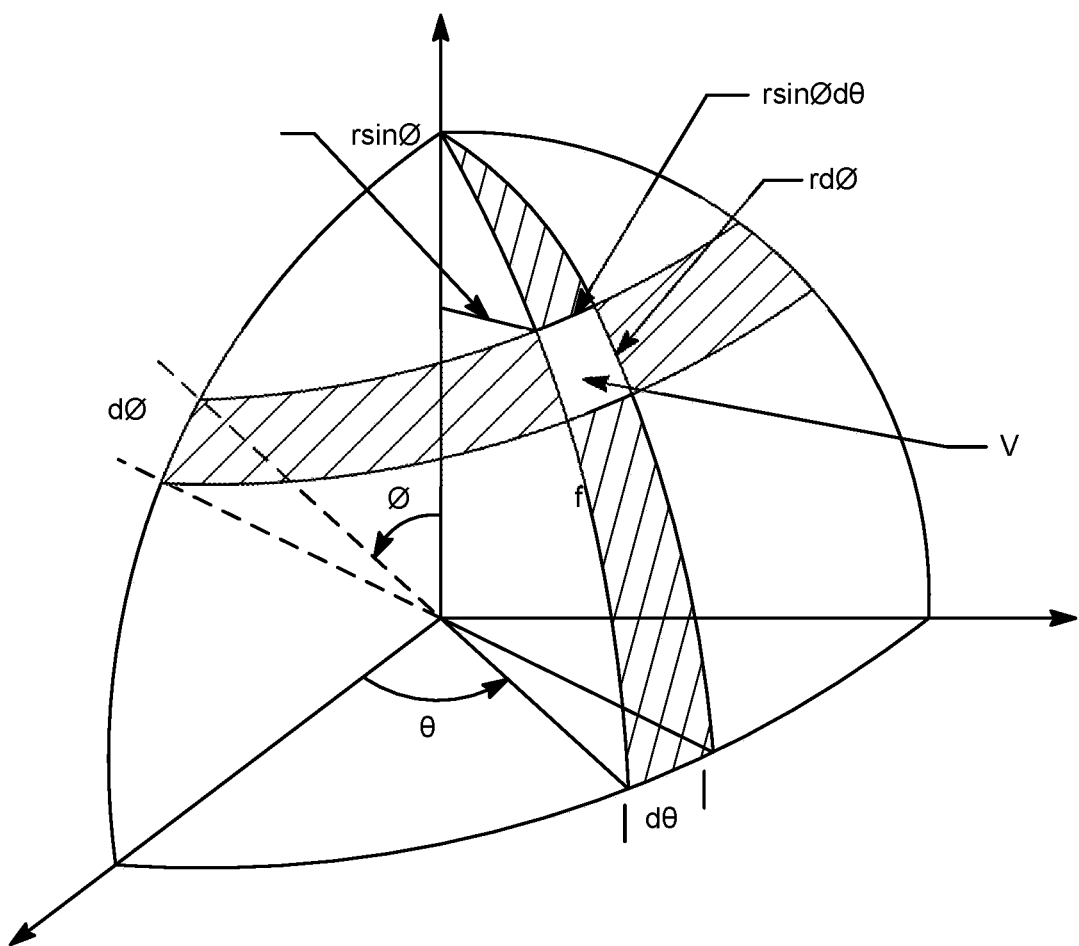
FIG. 12 depicts an example spherical coordinate viewport mapping.

FIG. 12 depicts an example spherical coordinate viewport. For a viewport (e.g., noted as V in FIG. 12), viewport_inc may specify a polar angle $\theta$, viewport_az may specify the azimuthal angle (φ), viewport_delta_inc may specify dθ, and/or viewport_delta_az may specify dφ.

To distinguish between a VRD using 2D coordinates (e.g., Table 4 or Table 6) and a VRD using spherical coordinates (e.g., Table 9), different @schemeIdUri values may be used in each case. For example, for 2D viewport descriptors, the @schemeIdUri value may be urn:mpeg:dash:viewport:2d:2016. For viewports based on spherical coordinates, the @schemeIdUri value may be "urn:mpeg:dash:viewport:sphere:2016".

Using a viewport descriptor that is based on the spherical coordinates may reduce signaling cost since viewports may only be specified for one coordinate system (e.g., the spherical coordinate system). Using a viewport descriptor that is based on the spherical coordinates may result in a simplified conversion process on the client side since each client may only need to implement a predefined conversion process. For example, each client may convert between the projection format the client chooses to use (e.g., equirectangular) and the spherical representation. When the client aligns the viewport coordinates, the client may use similar logic to decide which representation to request.

The VRD may be signaled in one or more Period.SupplementalProperty elements. The VRD may list available (e.g., all available) enhanced viewports respectively. A Representation may use an attribute, @viewportId, to signal one or more viewport indices to identify which enhanced viewport(s) are associated with the current Representation or Sub-Representation. With such a descriptor reference approach, redundant signaling of VRDs within a Representation may be avoided. One or more Representations with different associated viewport(s), projection formats, and/or layout formats may be allocated within a single AdaptationSet. Table 10 shows example semantics of Representation element attribute @viewportId and @viewport_quality.

As shown in Table 10, the attribute @viewport_quality may be signaled at a Representation level (e.g., instead of at the Period level) as part of the VRD. The @viewport_quality attribute may allow a client to select an appropriate quality level for one or more viewports of interest. For example, if the user is navigating through the 360 view frequently (e.g., turning head to look around all the time), the client may select a Representation with balanced quality between viewport and non-viewport. If the user is focusing on the viewport, the client may select a Representation with a high viewport quality (e.g., but relatively reduced quality in non-viewport areas). The @viewport_quality attribute may be signaled at the Representation level.

TABLE 10

Semantic of Representation attributes

| Element and/or Attribute Name Representation | Description |
| --- | --- |
| @viewportId | May specify one or more (e.g., all) identified viewports associated with the element as a whitespace-separated list of values of ViewportDescriptor@viewport_id attributes. |
| @viewport_quality | May specify the quality level of one or more corresponding viewports specified by @viewportId as a whitespace-separated list of values. |

Table 11 is an MAD example using the Representation attributes, @viewportId and @viewport_quality, shown in Table 10 to specify the associated viewports. Two VRDs may be specified in Period.SupplementalProperty. A first Representation (e.g., @id=0) may include one or more viewports (e.g., @viewportId=0), viewport #0 quality level may be 2. A second Representation (e.g., @id=1) may include the same one or more viewports as the first Representation (e.g., @viewportId=0), but the quality level of viewport #0 may be 4. A third Representation (e.g., @id=2) may include one or more enhanced viewports (e.g., @viewportId=1) with quality level 5. A fourth Representation (e.g., @id=3) may include two or more enhanced viewports (e.g., @viewportId=0, 1) with highest quality level (e.g., @viewport_quality=5, 5).

TABLE 11

MPD example with representation @viewportId attribute

```
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <ProgramInformation>
    <Title>Example of a DASH Media Presentation Description using Viewport
Relationship Description to indicate viewports of a 360 video</Title>
  </ProgramInformation>
  <Period>
    <SupplementalProperty schemeIdUri="urn:mpeg:dash:viewport:2d:2016"
value="0,0,0,360,640,4096,2048"/>
    <SupplementalProperty schemeIdUri="urn:mpeg:dash:viewport:2d:2016"
value="1,1000,1000,540,960,4096,2048"/>
    <AdaptationSet segmentAlignment="true" subsegmentAlignment="true"
subsegmentStartsWithSAP="1">
      <Representation @id="0" mimeType="video/mp4" codecs="avc1.42c01e"
width="1920" height="1080" bandwidth="226597" startWithSAP="1" @viewportId="0"
@viewport_quality="2">
        <BaseURL> e0.mp4</BaseURL>
      </Representation>
      <Representation @id="1" mimeType="video/mp4" codecs="avc1.42c033"
width="4096" height="2048" bandwidth="1055223" startWithSAP="1"
@viewportId="0" @viewport_quality="4">
        <BaseURL> e1.mp4</BaseURL>
```

TABLE 11-continued

MPD example with representation @viewportId attribute

```
    </Representation>
    <Representation @id="2" mimeType="video/mp4" codecs="avc1.42c01e"
width="1920" height="1080" bandwidth="226597" startWithSAP="1" @viewportId="1"
@viewport_quality="5">
        <BaseURL> e2.mp4</BaseURL>
    </Representation>
    <Representation @id="3" mimeType="video/mp4" codecs="avc1.42c033"
width="4096" height="2048" bandwidth="1055223" startWithSAP="1" @viewportId="0
1" @viewport_quality="5 5">
        <BaseURL> e3.mp4</BaseURL>
    </Representation>
  </AdaptationSet>
 </Period>
</MPD>
```

An enhanced viewport area may be selected to be larger than an actual viewing resolution, which may reduce quality degradation when the user changes (e.g., slightly changes) viewports. The enhanced viewport area may be selected to cover an area that a target object of interest moves around during a segment period (e.g., such that the user can watch the target object as the target moves around at the same high quality). One or more most watched viewports may be enhanced in a single bitstream, for example, to reduce the total number of Representations and/or corresponding media streams at the origin server or CDN. The viewport descriptors specified in Table 4, Table 6, Table 9, and/or Table 10 may support multiple quality-enhanced viewports within a single bitstream.

Figure 13A:
FIGS. 13A and 13B depict an example viewport enhancement representation.
Figure 13B:
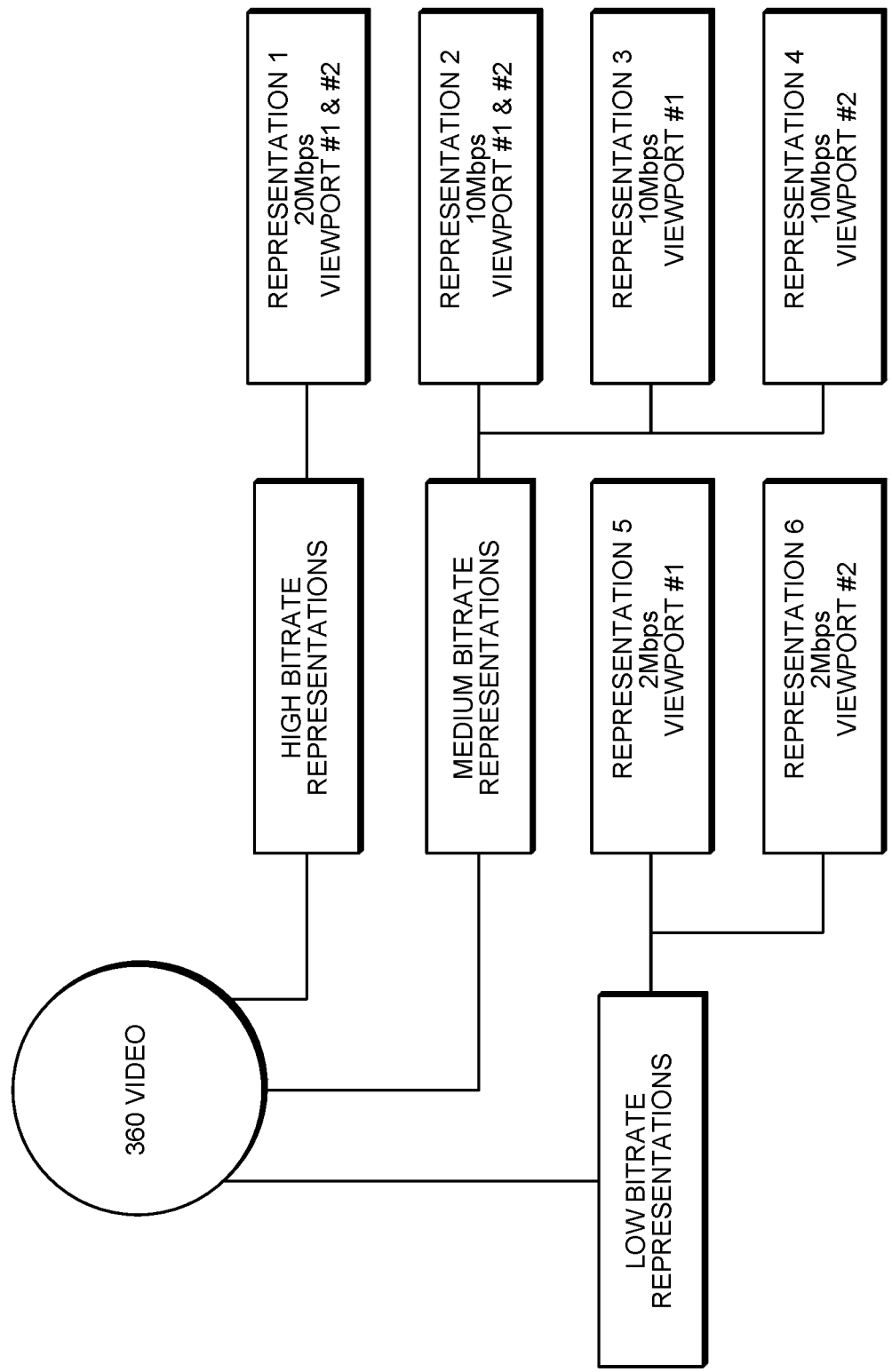

FIG. 13 depicts an example viewport enhancement representation. A 360° video may have two identified most viewed viewports (e.g., viewport #1 and viewport #2). One or more DASH Representations may correspond to the two identified most viewed viewports. At a high coding bitrate (e.g., 20 mbps), both viewports may be enhanced at high quality. When both viewports are enhanced at high quality, one Representation may be provided with both enhanced viewports (e.g., to facilitate fast viewport changes and/or save the storage cost). At a medium bitrate, three Representations may be provided with the quality enhancement on both viewports or on an individual viewport. The client may request different representations based on a preference for fast viewport changes and/or high quality of one of the viewports. At a lower bitrate, two Representations may be provided with enhancement of each viewport separately such that the client may request decent viewport quality based on a viewing direction. Representation selection may enable different trade-offs between low-latency viewport switching, lower storage cost, and/or decent viewing quality.

During an adaptive 360° video streaming session, a client may request a specific representation based on the available bandwidth, the viewport the user is watching, and/or the viewing direction change (for example, how fast and/or how often the viewport changes). The client WTRU may analyze one or more user habits locally using one or more gyroscope, accelerometer, and/or magnetometer tracking parameters to determine which Representations to request. For example, the client WTRU may request a Representation with an individual enhanced viewport if it detects that the user has not and/or does not change viewing direction frequently. To ensure low-latency rendering and/or sufficient viewport quality, the client WTRU may request a Representation with multiple enhanced viewports if it detects that the user keeps changing and/or has a tendency to change viewing directions.

Layer based 360 video delivery may be a viewport adaptive approach for 360° video streaming. Layer based 360 video delivery may decouple the viewport area from the entire frame. Layer based 360 video deliver may allow more flexible and/or efficient composition of various virtual and/or real objects onto the sphere.

An entire frame may be encoded as a full-frame video layer in lower quality, lower frame rate, and/or lower resolution. One or more viewports may be encoded into one or more quality Representations as the viewport layer. The viewport layer may be coded independently from the full-frame video layer. The viewport layer may be coded more efficiently using scalable coding, e.g., using scalable extensions of HEVC (SHVC), where the full-frame video layer is used as a reference layer to code the one or more viewport layer representations with inter-layer prediction. The user may always request the full-frame video layer (e.g., as a fallback layer). When the user WTRU has sufficient additional resource (e.g., bandwidth and/or computing resource), one or more high quality enhancement viewport(s) may be requested to overlay onto the full-frame video layer.

The pixels outside the viewport may be subsampled. The frame rate of the areas outside the viewport may not be directly reduced. The layer-based 360 video delivery may decouple the viewport(s) from the entire 360° video frame. The 360 video deliver may allow the viewport(s) to be coded at a higher bitrate, higher resolution, and/or higher frame rate, while the full-frame video layer 360° video may be coded at a lower bitrate, lower resolution, and/or lower frame rate.

The full-frame video layer may be coded in lower resolution and up-sampled for overlay at the client side. Upsampling the full-frame video layer at the client side may reduce the storage cost and/or provide acceptable quality at a lower bitrate. For the viewport layer, multiple quality Representations of the viewport(s) may be generated for a fine-granularity quality adaptation.

Figure 14:
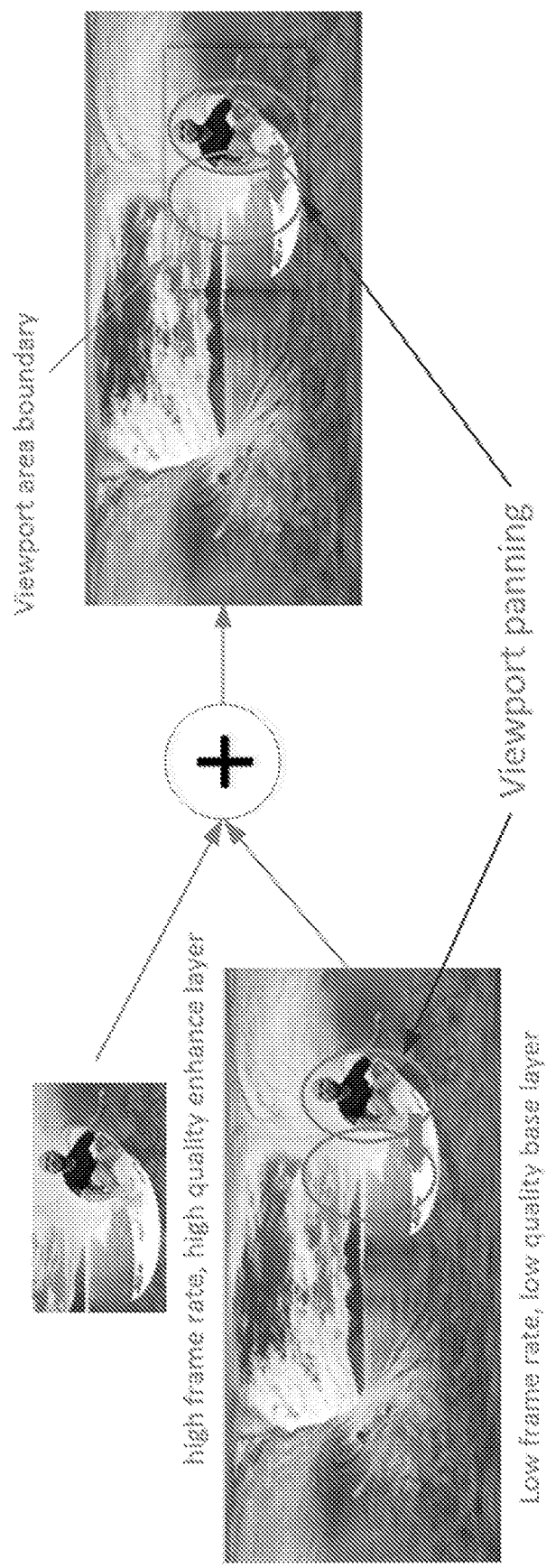
FIG. 14 depicts an example layer-based 360° video overlay.

FIG. 14 depicts an example layer-based 360 video overlay. For example, a high quality viewport may be overlayed onto a 360 full frame video layer. The full-frame video layer stream may include the entire 360° video at a lower quality. The enhancement layer stream may include an enhanced viewport at a high quality.

One or more directional low pass filters may be applied across the overlay boundaries (e.g., horizontal and/or vertical boundaries) to smooth the abrupt quality changes. For example, a 1D or 2D low pass filter may be applied on a vertical boundary to smooth out one or more horizontal neighboring pixels along the vertical boundary and/or a similar low pass filter may be applied on a horizontal boundary to smooth out one or more vertical neighboring pixels along the horizontal boundary.

The full-frame video layer may include full 360° video in different projection formats such as equirectangular, cube-map, offset cube-map, pyramid, etc. A projection format may have multiple full-frame video layer Representations supporting different quality levels such as resolution, bitrate, and/or frame rate.

The viewport layer may include multiple viewports. A viewport may have a number of quality Representations with different resolutions, bitrate, and/or frame rate for adaptive streaming. Multiple Representations may be provided to support fine-granularity quality adaptation, without incurring high storage and/or transmission cost (e.g., since each viewport's size is relatively small compared to the size of the entire 360° video).

Figure 15:
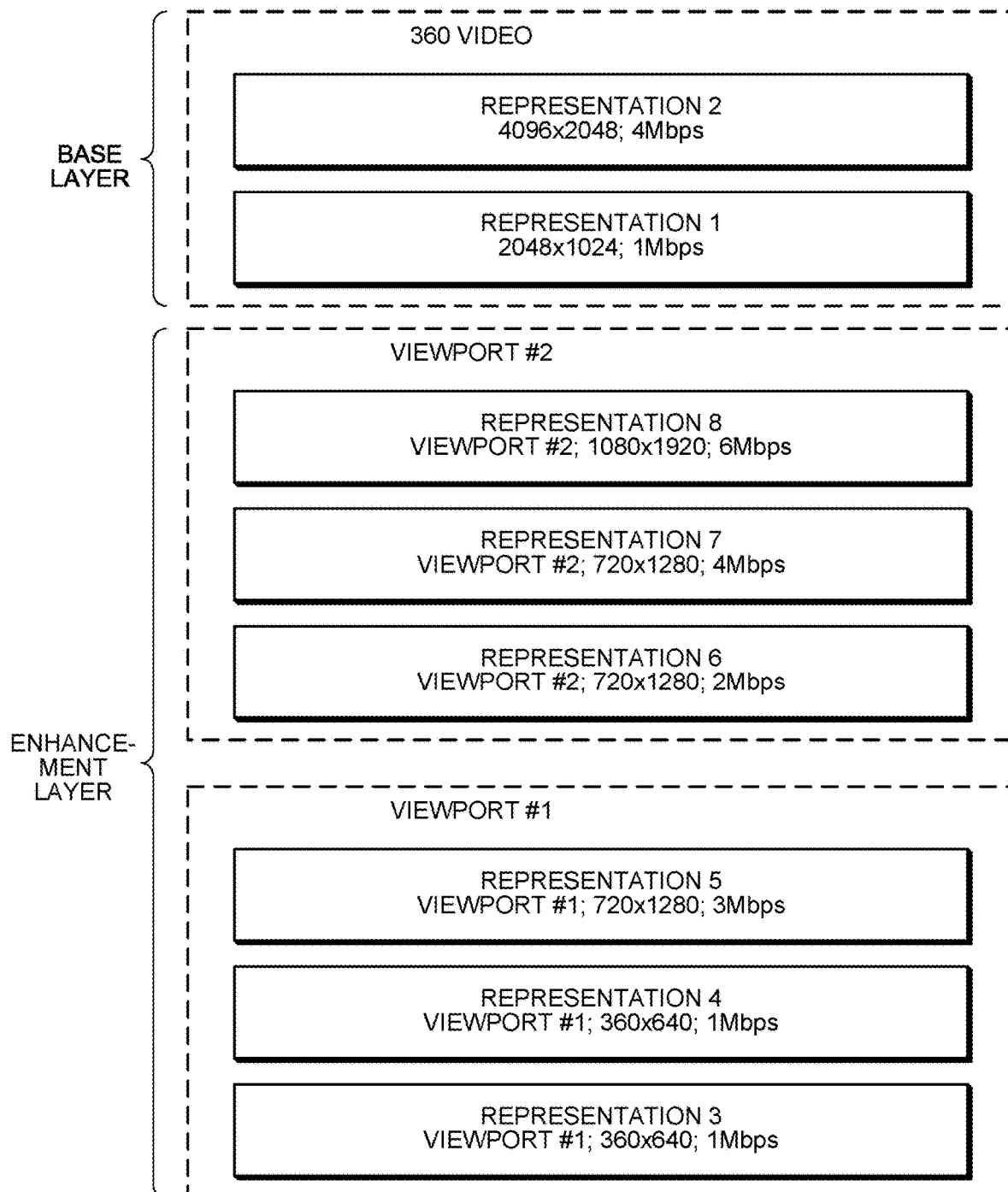
FIG. 15 depicts an example layer-based 360° video representation.

FIG. 15 depicts an example layer based 360 video representation. For example, two or more Representations may be available at the full-frame video layer for full 360° video with different resolutions (2048×1024@30 fps and 4096×2048@30 fps). Two or more target viewports (e.g., viewport #1 and viewport #2) may be available at the viewport layer. Viewport #1 and #2 may have Representations with different resolution(s) and/or different bitrate(s). A viewport layer Representation may use @dependencyId to identify a particular full-frame video layer Representation as the dependent Representation. The user may request the target viewport Representation and/or its dependent full-frame video layer full frame Representation to compose the final 360° video for rendering.

A MPEG-DASH SRD element may be used to support layer-based 360 video streaming. Depending on the application, the MPD author may use one or more SRD values to describe a spatial relationship between a full-frame video layer 360° full video and a viewport layer video. The SRD element may specify the spatial relationship of spatial objects. The SRD element may not specify how to overlay one or more viewport(s) video onto the full-frame video layer. Viewport overlay may be specified to improve streaming quality for layer-based 360° video streaming.

Viewpoint overlay may be used with the Role descriptor applied to an AdaptationSet element. A Role element with @schemeIdURI equal to "urn:mpeg:dash:viewport:overlay:2016" may signal which Representation is associated with the viewport layer video and/or which Representation is associated with the full-frame video layer. The @value of the Role element may include one or more overlay indicators. For example, the one or more overlay indicators may include 'f' and/or 'v,' where "f" indicates the associated video Representation is a full-frame video layer and "v" indicates the associated video Representation is a viewport video to be overlaid on the full-frame video layer. One or more viewport videos may be overlaid onto a full-frame video layer. The @dependencyId may specify a particular full-frame video layer Representation for an associated viewport video overlay composition. An original full-frame video layer resolution may be indicated by one or more SRD parameters (e.g., total_width and total_height of associated AdaptationSet). The viewport original resolution may be indicated by the one or more SRD parameters object_width and object_height of associated AdaptationSet. When the resolution of the Representation indicated by @width and @height is less than a corresponding resolution specified by SRD, the reconstructed video may be up-sampled to align the full-frame video layer and the enhancement layer video for the overlay. Table 12 is an example MPD SRD annotation for the layer based 360° video Representation example shown in FIG. 15.

In Table 12, two or more full-frame Representations identified with @id may be included in the same AdaptationSet. A first Representation (@id=2) may include full resolution 4096×2048, and a second Representation (@id=1) may include half resolution. The AdaptationSet may include a SRD describing that the AdaptationSet element spans the entire reference space since the object_width and object_height parameters are equal to the total_width and total_height parameters. The AdaptationSet may include two or more Representations that represent the same spatial part of the source but with different resolutions (e.g., a first Representation may have 4096×2048 resolution and a second Representation may have 2048×1024 resolution). The Role element of the AdaptationSet with @schemeIdUri equal to "urn:mpeg:dash:viewport:overlay:2016" and @value equal to "b1" may indicate that one or more AdaptaionSet elements are full-frame video layer full video. When the full-frame video layer Representation resolution specified by value of attribute @width and @height is not equal to the value of SRD parameters @total_width and @total_height, the full-frame video layer video may be up-scaled to match the full-frame video layer Representation resolution.

For the enhancement layer, viewport #1 Representations may be included in a first AdaptationSet, and viewport #2 Representations may be included in a second AdaptationSet. Each viewport may have different resolution and/or bandwidth. The AdaptationSet may include a SRD describing that the video in the AdaptationSet element represents only a part of the full 360° video (e.g., because its object_width and object_height parameters are less than its total_width and total_height respectively). The Role element of the AdaptationSet with @schemeIdUri equal to "urn:mpeg:dash:viewport:overlay:2016" and @value equal to "f" may indicate the AdaptationSet elements are viewport video. When the viewport Representation resolution specified by value of attribute @width and @height is not equal to the value of SRD parameters @object_width and @object_height, the viewport video may be up-scaled to match the original full-frame resolution.

One or more (e.g., all) AdaptationSets may use the same first parameter source_id to indicate that the videos in AdaptationSets spatially relate to each other within a reference space at 4096×2048. A non SRD-aware client may only see the full-frame video layer full video due to the use of SupplementalProperty rather than EssentialProperty. An SRD-aware client may form a 360° video by overlaying viewport #1 (@id=3/4/5) and/or viewport #2 (@id=6/7/8) video (e.g., to be up-sampled if necessary) on either full-frame video layer (@id=1/2).

TABLE 12

MPD SRD example for layer-based 360 video

```
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:schema:mpd:2011 DASH-MPD.xsd"
```

TABLE 12-continued

MPD SRD example for layer-based 360 video

```
[...]>
<Period>
 <!-- Full 360 video full-frame video layer -->
 <AdaptationSet [...]>
  <Role schemeIdUri="urn:mpeg:dash:viewport:overlay:2016" value="f"/>
  <SupplementalProperty schemeIdUri="urn:mpeg:dash:srd:2014"
   value="1, 0, 0, 4096, 2048, 4096, 2048"/>
  <Representation id="1" bandwidth="1000000" width="2048" height="1024" ...>
   <BaseURL>b1.mp4</BaseURL>
  </Representation>
  <Representation id="2" bandwidth="4000000" width="4096" height="2048" ...>
   <BaseURL>b2.mp4</BaseURL>
  </Representation>
 </AdaptationSet>
 <!-- viewport 1 video -->
 <AdaptationSet [...]>
  < Role schemeIdUri="urn:mpeg:dash:viewport:overlay:2016" value="v"/>
  < EssentialProperty schemeIdUri="urn:mpeg:dash:srd:2014"
   value="1, 100, 100, 720, 1280, 4096, 2048"/>
  <Representation id="3" bandwidth="1000000" width="360" height="640"...>
   <BaseURL>e3.mp4</BaseURL>
  </Representation>
  <Representation id="4" bandwidth="2000000" width="360" height="640"...>
   <BaseURL>e4.mp4</BaseURL>
  </Representation>
  <Representation id="5" bandwidth="3000000" width="720" height="1280"...>
   <BaseURL>e5.mp4</BaseURL>
  </Representation>
 </AdaptationSet>
 <!-- viewport 2 video -->
 <AdaptationSet [...]>
  < Role schemeIdUri="urn:mpeg:dash:viewport:overlay:2016" value="v"/>
  < EssentialProperty schemeIdUri="urn:mpeg:dash:srd:2014"
   value="1, 2000, 100, 1080, 1920, 4096, 2048"/>
  <Representation id="6" bandwidth="2000000" width="720" height="1280"...>
   <BaseURL>e6.mp4</BaseURL>
  </Representation>
  <Representation id="7" bandwidth="4000000" width="720" height="1280"...>
   <BaseURL>e7.mp4</BaseURL>
  </Representation>
  <Representation id="8" bandwidth="6000000" width="1080" height="1920"...>
   <BaseURL>e8.mp4</BaseURL>
  </Representation>
 </AdaptationSet>
</Period>
</MPD>
```

Figure 16:
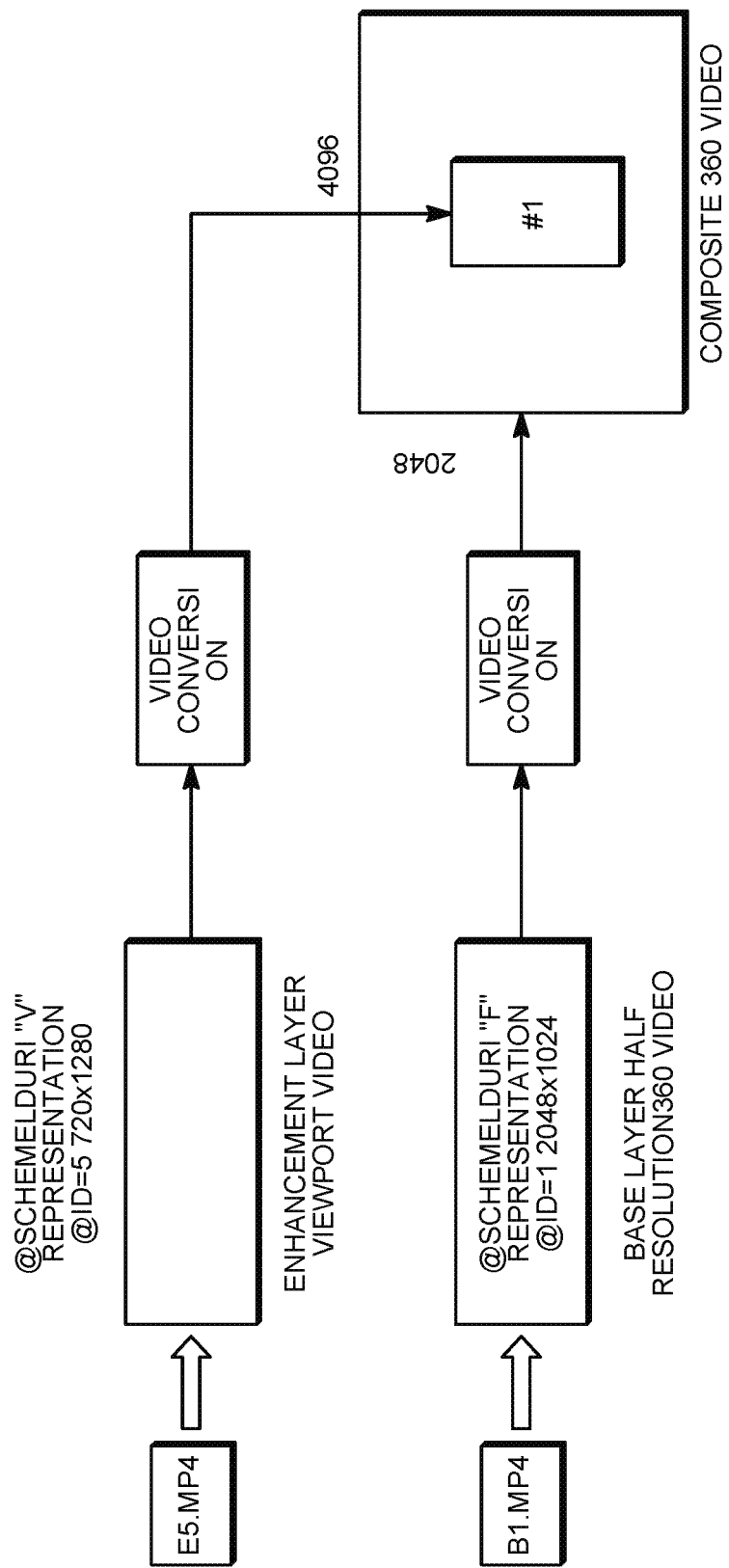
FIG. 16 depicts an example layer-based 360° video overlay.

FIG. 16 depicts an example layer-based 360 video overlay. For example, the example layer-based 360 video overlay may be associated with the Representations listed in Table 12. The client may request a half resolution full-frame video layer Representation (@id=1) and the enhancement layer viewport #1 Representation (@id=5). The half resolution full-frame video layer may be up-sampled to a full resolution 4096×2048 since its Representation resolution, @width=2048 and @height=1024, is less than the associated SRD parameters, @total_width=4096 and @total_height=2048. The high quality viewport may be overlaid on the 360 video at the position signaled by object_x (e.g., 100) and object_y (e.g., 100) as signaled in the associated SRD parameters.

The video conversion shown in FIG. 16 may perform up-scaling, projection conversion, and/or layout conversion (e.g., when the Representation resolution, projection and/or layout are not matched between the full-frame video layer and the viewport video).

Figure 17:
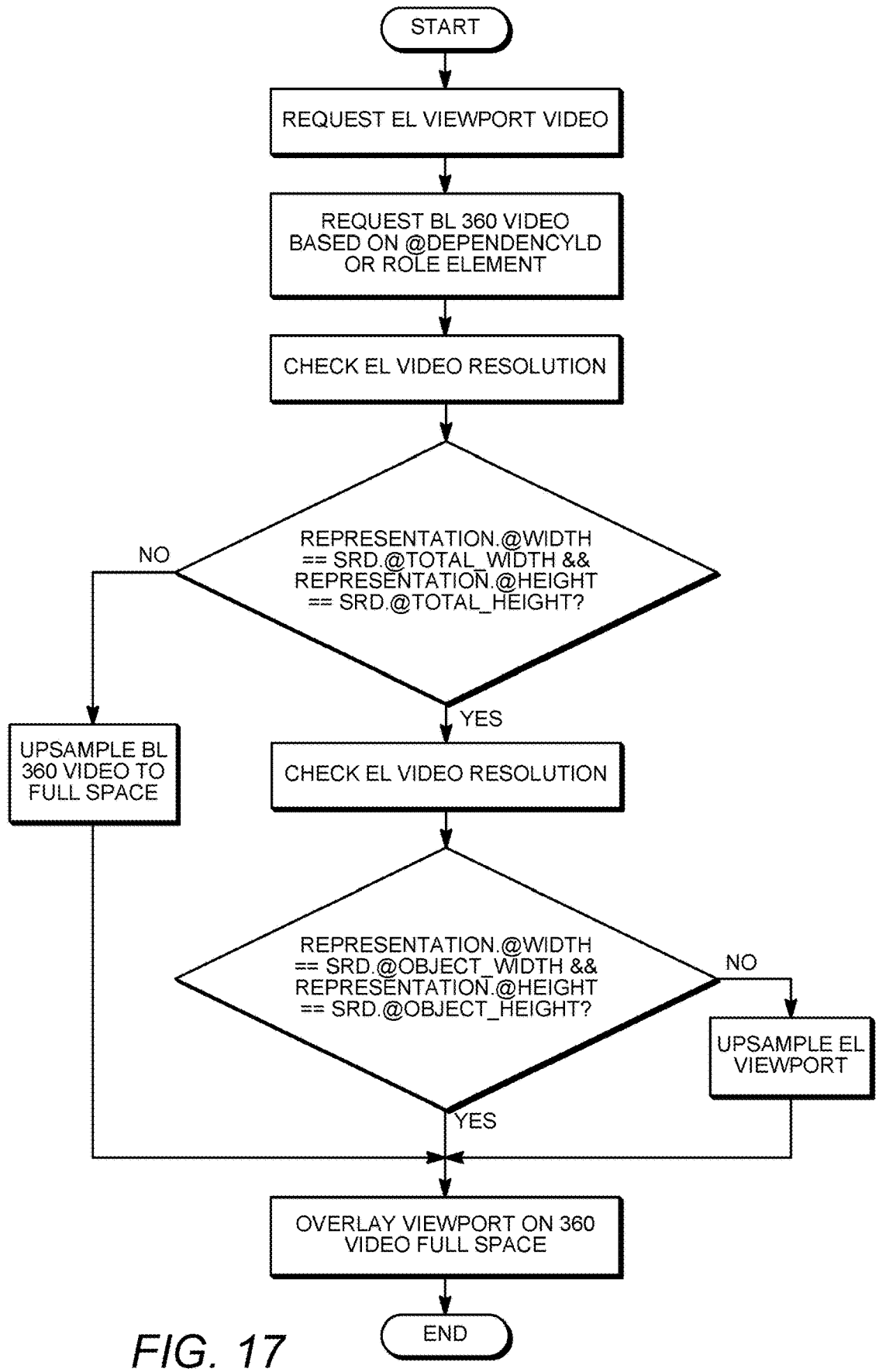
FIG. 17 depicts a flowchart of an example layer-based 360° video overlay.

FIG. 17 depicts an example layer-based 360 video overlay flowchart.

The full-frame video layer and the enhancement layer representation may have different frame rates. Because the attribute @frameRate, along with @width, @height, and @bandwidth, are specified as common attributes and elements for AdaptationSet, Representation, and Sub-Representation elements, @width, @heightthe and @framerate may be signaled for AdaptationSet, Representation, and/or Sub-Representation. When the @frameRate is signaled at AdaptationSet level, one or more Representations allocated to the AdaptationSet may share the same value of @frameRate. Table 13 is an MPD example for the Representations with different frame rate at the AdaptationSet level.

TABLE 13

MPD SRD example for layer based 360 video with different frame rate representations

```
<?xml version="1.0" encoding="UTF-8"?>
<MPD
 xmlns:xsi="http://www.w3.org/2001/XMLSchema-instance"
```

TABLE 13-continued

MPD SRD example for layer based 360 video with different frame rate representations

```
xmlns="urn:mpeg:dash:schema:mpd:2011"
xsi:schemaLocation="urn:mpeg:dash:schema:mpd:2011 DASH-MPD.xsd"
[...]>
<Period>
  <!-Full 360 video full-frame video layer -->
  <AdaptationSet mimeType="video/mp4" width="4096" height="2048" framerate="30">
    < Role schemeIdUri="urn:mpeg:dash:viewport:overlay:2016" value="f"/>
    <SupplementalProperty schemeIdUri="urn:mpeg:dash:srd:2014"
      value="1, 0, 0, 4096, 2048, 4096, 2048"/>
    <Representation id="1" bandwidth="1000000" width="2048" height="1024" ...>
      <BaseURL>b1.mp4</BaseURL>
    </Representation>
  </AdaptationSet>
  <AdaptationSet mimeType="video/mp4" width="4096" height="2048" framerate="60">
    < Role schemeIdUri="urn:mpeg:dash:viewport:overlay:2016" value="f"/>
    <SupplementalProperty schemeIdUri="urn:mpeg:dash:srd:2014"
      value="1, 0, 0, 4096, 2048, 4096, 2048"/>
    <Representation id="2" bandwidth="4000000" width="4096" height="2048" ...>
      <BaseURL>b2.mp4</BaseURL>
    </Representation>
  </AdaptationSet>
  <!-viewport 1 video -->
  <AdaptationSet mimeType="video/mp4" width="4096" height="2048" framerate="30">
    < Role schemeIdUri="urn:mpeg:dash:viewport:overlay:2016" value="v"/>
    < EssentialProperty schemeIdUri="urn:mpeg:dash:srd:2014"
      value="1, 100, 100, 720, 1280, 4096, 2048"/>
    <Representation id="3" bandwidth="1000000" width="360" height="640"
dependencyId="1"...>
      <BaseURL>e3.mp4</BaseURL>
    </Representation>
    <Representation id="4" bandwidth="2000000" width="360" height="640"
dependencyId="1"...>
      <BaseURL>e4.mp4</BaseURL>
    </Representation>
  </AdaptationSet>
  <AdaptationSet mimeType="video/mp4" width="4096" height="2048" framerate="60">
    < Role schemeIdUri="urn:mpeg:dash:viewport:overlay:2016" value="v"/>
    < EssentialProperty schemeIdUri="urn:mpeg:dash:srd:2014"
      value="1, 100, 100, 720, 1280, 4096, 2048"/>
    <Representation id="5" bandwidth="3000000" width="720" height="1280"
dependencyId="1"...>
      <BaseURL>e5.mp4</BaseURL>
    </Representation>
  </AdaptationSet>
  <!-viewport 2 video -->
  <AdaptationSet mimeType="video/mp4" width="4096" height="2048" framerate="30">
    < Role schemeIdUri="urn:mpeg:dash:viewport:overlay:2016" value="v"/>
    < EssentialProperty schemeIdUri="urn:mpeg:dash:srd:2014"
      value="1, 2000, 100, 1080, 1920, 4096, 2048"/>
    <Representation id="6" bandwidth="2000000" width="720" height="1280"
dependencyId="2"...>
      <BaseURL>e6.mp4</BaseURL>
    </Representation>
    <Representation id="7" bandwidth="4000000" width="720" height="1280"
dependencyId="2"...>
      <BaseURL>e7.mp4</BaseURL>
    </Representation>
  </AdaptationSet>
  <AdaptationSet mimeType="video/mp4" width="4096" height="2048" framerate="60">
    < Role schemeIdUri="urn:mpeg:dash:viewport:overlay:2016" value="v"/>
    < EssentialProperty schemeIdUri="urn:mpeg:dash:srd:2014"
      value="1, 2000, 100, 1080, 1920, 4096, 2048"/>
    <Representation id="8" bandwidth="6000000" width="1080" height="1920"
dependencyId="2"...>
      <BaseURL>e8.mp4</BaseURL>
    </Representation>
  </AdaptationSet>
</Period>
</MPD>
```

Multiple target viewport videos may be requested and/or overlaid on a 360° full video sphere. Based on a user orientation position, the user may request multiple high quality viewports at the same time (e.g., to facilitate fast viewport changes and/or reduce overall system latency). One or more (e.g., all) viewport layers may share the same full-frame video layer 360° video as a reference space. The client may overlay the multiple viewports it received onto the same reference space for rendering. When the projection and layout are different among full-frame video layer and enhancement layer viewport, the full-frame video layer video may be used as an anchor format and/or the enhancement layer viewport may be converted into the anchor format (e.g., so that the composition position can be aligned between full-frame video layer and the viewport video).

Figure 18:
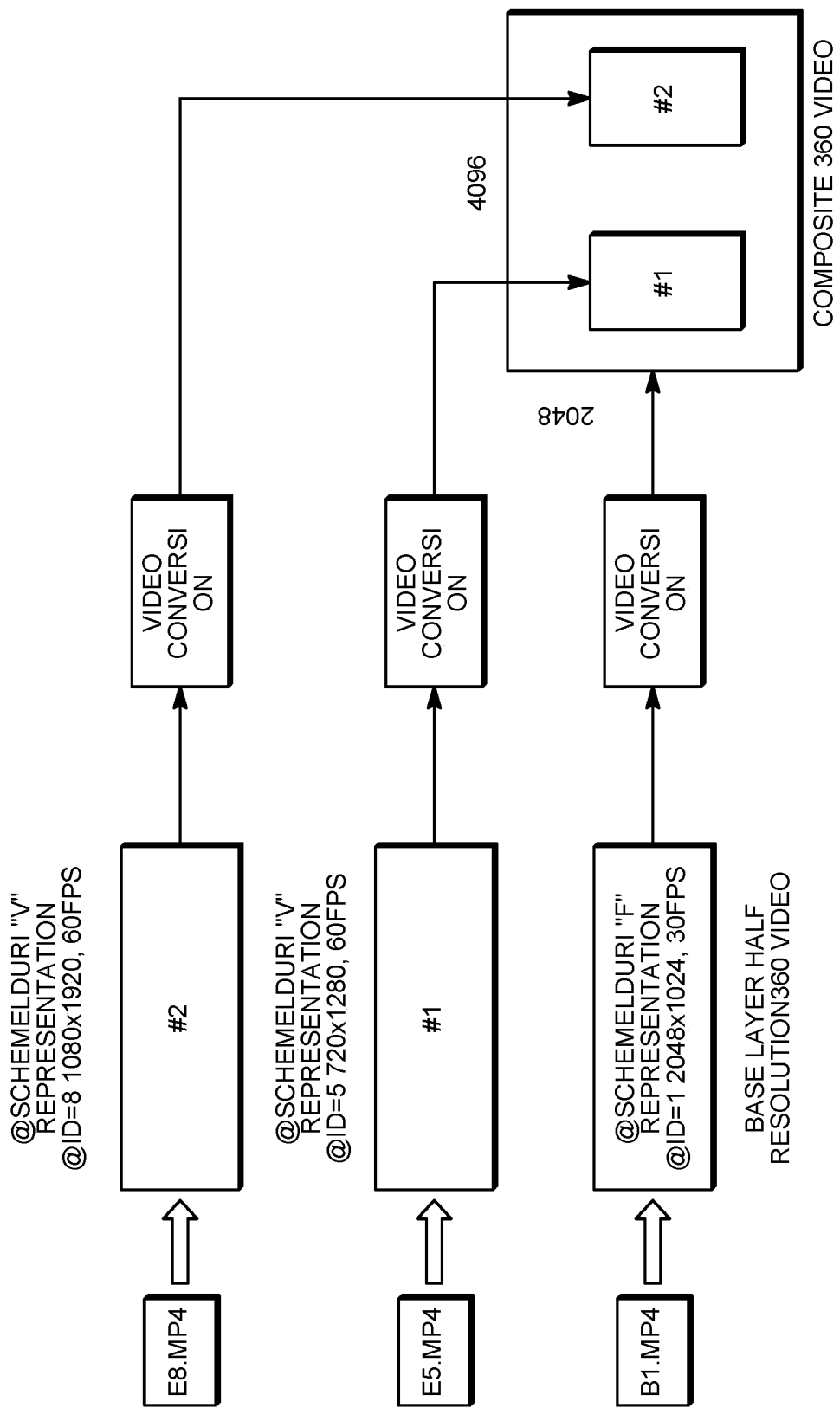
FIG. 18 depicts an example layer-based 360° video overlay with multiple viewports.

FIG. 18 depicts an example multiple viewports overlay. For example, a layer based overlay with two enhanced viewports may be signaled, as shown in Table 13. The client may request a full-frame video layer 360° video (e.g., Representation @id=1) as a reference space and/or two high quality enhancement layer viewports (e.g., Representations @id=5 and @id=8). A composite video with two enhanced viewports may be generated based on a determination that both viewports may be watched in the near-term timeframe (e.g., during the same segment duration). Additional project and/or layout conversion may be performed if the video type, projection, and/or layout are different between the full-frame video layer video and the enhancement layer viewport. A layer-based 360 video overlay may be able to adapt to the viewport changes more efficiently. The segment length of the full-frame video layer may be increased to improve the coding efficiency (e.g., because the full-frame video layer video is always delivered). The segment length of the viewport video layer may be kept shorter to accommodate for fast switching between viewports.

The layer-based 360 video overlay described herein may use SRD to describe the spatial relationship of viewport video and/or overlay to describe the overlay procedure to form the composite video. One or more spatial parameters such as source_id, object_x, object_y, object_width, object_height, total_width, and/or total_height specified in SRD may be merged into an overlay @value to simplify the MPD structure. The @value of the Role element may include a comma-delimited list of viewport indicator, source_id, object_x, object_y, object_width, object_height, total_width, and/or total_height. Table 14 shows an MPD example with a merged overlay.

TABLE 14

MPD example of overlay w/o SRD

```
<?xml version="1.0" encoding="UTF-8"?>
<MPD
 xmlns:xsi="http://www.w3.org/2001/XMLSchema-instance"
 xmlns="urn:mpeg:dash:schema:mpd:2011"
 xsi:schemaLocation="urn:mpeg:dash:schema:mpd:2011 DASH-MPD.xsd"
 [...]>
 <Period>
  <!-Full 360 video full-frame video layer -->
  <AdaptationSet mimeType="video/mp4" width="4096" height="2048" framerate="30">
    < Role schemeIdUri="urn:mpeg:dash:viewport:overlay:2016" value="'f', 1, 0, 0,
4096, 2048, 4096, 2048"/>
    <Representation id="1" bandwidth="1000000" width="2048" height="1024" ...>
     <BaseURL>b1.mp4</BaseURL>
    </Representation>
  </AdaptationSet>
  <AdaptationSet mimeType="video/mp4" width="4096" height="2048" framerate="60">
    < Role schemeIdUri="urn:mpeg:dash:viewport:overlay:2016" value="'f', 1, 0, 0,
4096, 2048, 4096, 2048"/>
    <Representation id="2" bandwidth="4000000" width="4096" height="2048" ...>
     <BaseURL>b2.mp4</BaseURL>
    </Representation>
  </AdaptationSet>
  <!-viewport 1 video -->
  <AdaptationSet mimeType="video/mp4" width="4096" height="2048" framerate="30">
    < Role schemeIdUri="urn:mpeg:dash:viewport:overlay:2016" value="'v', 1, 100,
100, 720, 1280, 4096, 2048"/>
    <Representation id="3" bandwidth="1000000" width="360" height="640"
     <BaseURL>e3.mp4</BaseURL>
    </Representation>
    <Representation id="4" bandwidth="2000000" width="360" height="640"
     <BaseURL>e4.mp4</BaseURL>
    </Representation>
  </AdaptationSet>
  <AdaptationSet mimeType="video/mp4" width="4096" height="2048" framerate="60">
    < Role schemeIdUri="urn:mpeg:dash:viewport:overlay:2016" value="'v', 1, 100,
100, 720, 1280, 4096, 2048"/>
    <Representation id="5" bandwidth="3000000" width="720" height="1280" ...>
     <BaseURL>e5.mp4</BaseURL>
    </Representation>
  </AdaptationSet>
  <!-viewport 2 video -->
  <AdaptationSet mimeType="video/mp4" width="4096" height="2048" framerate="30">
    < Role schemeIdUri="urn:mpeg:dash:viewport:overlay:2016" value="'v', 1, 2000,
100, 1080, 1920, 4096, 2048"/>
    <Representation id="6" bandwidth="2000000" width="720" height="1280"...>
     <BaseURL>e6.mp4</BaseURL>
    </Representation>
    <Representation id="7" bandwidth="4000000" width="720" height="1280"...>
     <BaseURL>e7.mp4</BaseURL>
    </Representation>
  </AdaptationSet>
  <AdaptationSet mimeType="video/mp4" width="4096" height="2048" framerate="60">
    < Role schemeIdUri="urn:mpeg:dash:viewport:overlay:2016" value="'v', 1, 2000,
100, 1080, 1920, 4096, 2048"/>
    <Representation id="8" bandwidth="6000000" width="1080" height="1920"...>
```

TABLE 14-continued

MPD example of overlay w/o SRD

```
      <BaseURL>e8.mp4</BaseURL>
    </Representation>
   </AdaptationSet>
  </Period>
</MPD>
```

The layer-based 360 video overlay may be provided by one or more descriptors such as SupplementalProperty and/or EssentialProperty with @schemeIdUri equal to "urn:mpeg:dash:viewport:overlay:2016".

Different video Representations may be in different projection formats (e.g., one Representation is equirectangular whereas another representation is cube-map or one video Representation is spherical video while another video Representation is rectilinear). The video property may be specified from the OMAF file format. One or more Common attributes specified for AdaptationSet, Representation, and/or Sub-Representation, @videoType, may indicate the video type such as spherical video, light field video, and/or rectilinear video. For Spherical video, different projection formats and/or projection+layout combinations, such as equirectangular, cube-map (e.g., in combination with different layouts in FIG. 10) and/or Pyramid map may be signaled as Common attribute @projection and/or @layout for AdaptationSet, Representation, and/or Sub-Representation elements. The element and attributes may be provided using SupplementalProperty and/or EssentialProperty elements.

Table 15 is a semantic example of a video type and/or a projection attribute. The projection attribute may assist the user to request the appropriate video based on the client's capability. For example, a client that does not support spherical video and/or light field video may request a rectilinear video only. In an example, a client that supports spherical video may select an appropriate format (e.g., equirectangular instead of cube-map) from the set of available formats.

TABLE 15

Common Adaptation Set, Representation, and/or Sub-Representation attributes and elements

| Element and/or Attribute Name Common attributes and elements | Description |
|---|---|
| @videoType | May specify the video type in the form of an integer as specified in Table 16. If not present, the value may be inferred to be "rectilinear" |
| @projection | May specify the projection method used to project omnidirectional video into rectilinear video frame as specified in Table 17. If @videoType is equal to 2, the value of @projection may be specified in Table 17 |
| @layout | May specify the layout of projected omnidirectional video in the form of an integer. The value of @layout may be specified in Table 18 |

TABLE 16

Value of @videoType

| Value | Geometry Type |
|---|---|
| 0 | Rectilinear video |
| 1 | Panorama video |
| 2 | Sphere video |
| 3 | Lightfield video |
| ... | ... |

TABLE 17

Value of @projection

| Value | Geometry Type |
|---|---|
| 0 | Equirectangular |
| 1 | Cube |
| 2 | Offset cube |
| 3 | Squished sphere |
| 4 | Pyramid |
| 5 | Cylinder |
| ... | ... |

TABLE 18

Value of @layout

| @projection | @layout | Layout format |
|---|---|---|
| 0 | 0 | Plate carree |
|   | 1 | Poles on the side (half height) |
|   | 2 | Poles on the side (full height) |
| 1 | 3 | Single row |
|   | 4 | 2 × 3 |
|   | 5 | 180° |
| ... | ... | ... |

The layout formats in Table 18 may be illustrated in the following figures.

Figure 19:
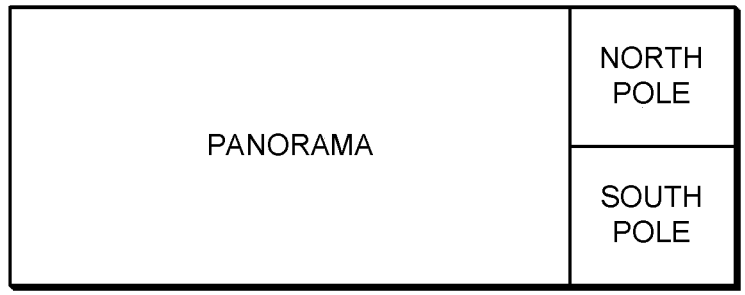
FIG. 19 depicts an example equirectangular representation with half height poles on the side.

FIG. 19 depicts an example equirectangular representation with half height poles on the side.

Figure 20:
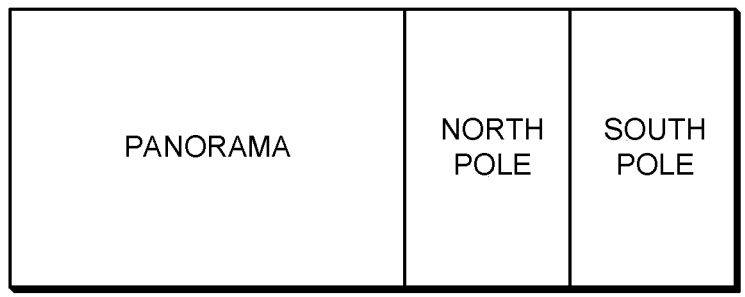
FIG. 20 depicts an example equirectangular representation with full height poles on the side.

FIG. 20 depicts an example equirectangular representation with full height poles on the side.

Figure 21:
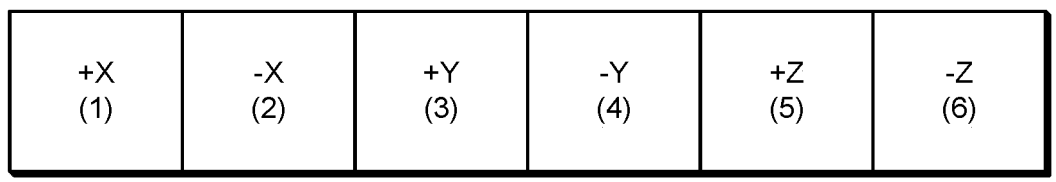
FIG. 21 depicts an example single row layout cube representation.

FIG. 21 depicts an example single row layout for the cube representation format (e.g., with region_id).

Figures 22, 23:
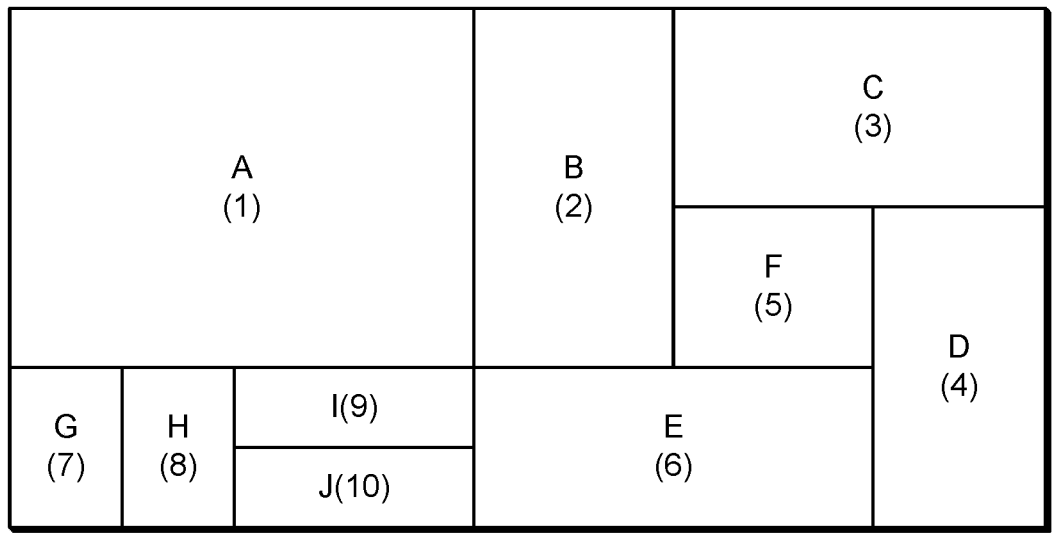
FIG. 22 depicts an example 2×3 layout cube representation.
FIG. 23 depicts an example 180° cube-map layout.

FIG. 22 depicts an example 2×3 layout for the cube representation format (e.g., with region_id).

FIG. 23 depicts an example 180° layout for cube-map.

The 180° layout for the cube map projection may reduce the resolution of the back half of the cube by 25% (e.g., by reducing the width and height of the back half areas by half) and/or may use the layout shown in FIG. 23 for the result, where regions a, b, c, d, and e belong to the front half and regions f, g, h, i, and j belong to the back half.

Table 19 is an MPD example using such common attributes and elements to support both equirectangular and cube-map projections.

TABLE 19

MPD example with Common attribute

```xml
<?xml version="1.0" encoding="UTF-8"?>
<MPD
  xmlns="urn:mpeg:dash:schema:mpd:2011"
  type="static"
  mediaPresentationDuration=" PT10S"
  minBufferTime="PT1S"
  profiles="urn:mpeg:dash:profile:isoff-on-demand:2011">
  <ProgramInformation>
    <Title>Example of a DASH Media Presentation Description using
    @projection and @layout attributes to indicate viewports of a 360
    video</Title>
  </ProgramInformation>
  <Period>
    <!-- Equirectangular Video -->
    <AdaptationSet segmentAlignment="true" subsegmentAlignment=
    "true" subsegmentStartsWithSAP="1" videoType="2"
    projection="0" layout="0">
      <Representation mimeType="video/mp4" codecs="avc1.42c01e"
      width="1920" height="1080" bandwidth="226597" startWithSAP=
      "1">
        <BaseURL> e1.mp4</BaseURL>
      </Representation>
      <Representation mimeType="video/mp4" codecs="avc1.42c033"
      width="4096" height="2048" bandwidth="1055223" startWithSAP=
      "1">
        <BaseURL> e2.mp4</BaseURL>
      </Representation>
    </AdaptationSet>
    <!-- Cubemap 2x3 Video -->
    <AdaptationSet segmentAlignment="true" subsegmentAlignment=
    "true" subsegmentStartsWithSAP="1" videoType="2"
    projection="1" layout="1">
      <Representation mimeType="video/mp4" codecs="avc1.42c01e"
      width="1920" height="1080" bandwidth="226597" startWithSAP=
      "1">
        <BaseURL> c1.mp4</BaseURL>
      </Representation>
      <Representation mimeType="video/mp4" codecs="avc1.42c033"
      width="4096" height="2048" bandwidth="1055223" startWithSAP=
      "1">
        <BaseURL> c2.mp4</BaseURL>
      </Representation>
    </AdaptationSet>
  </Period>
</MPD>
```

Figure 24A:
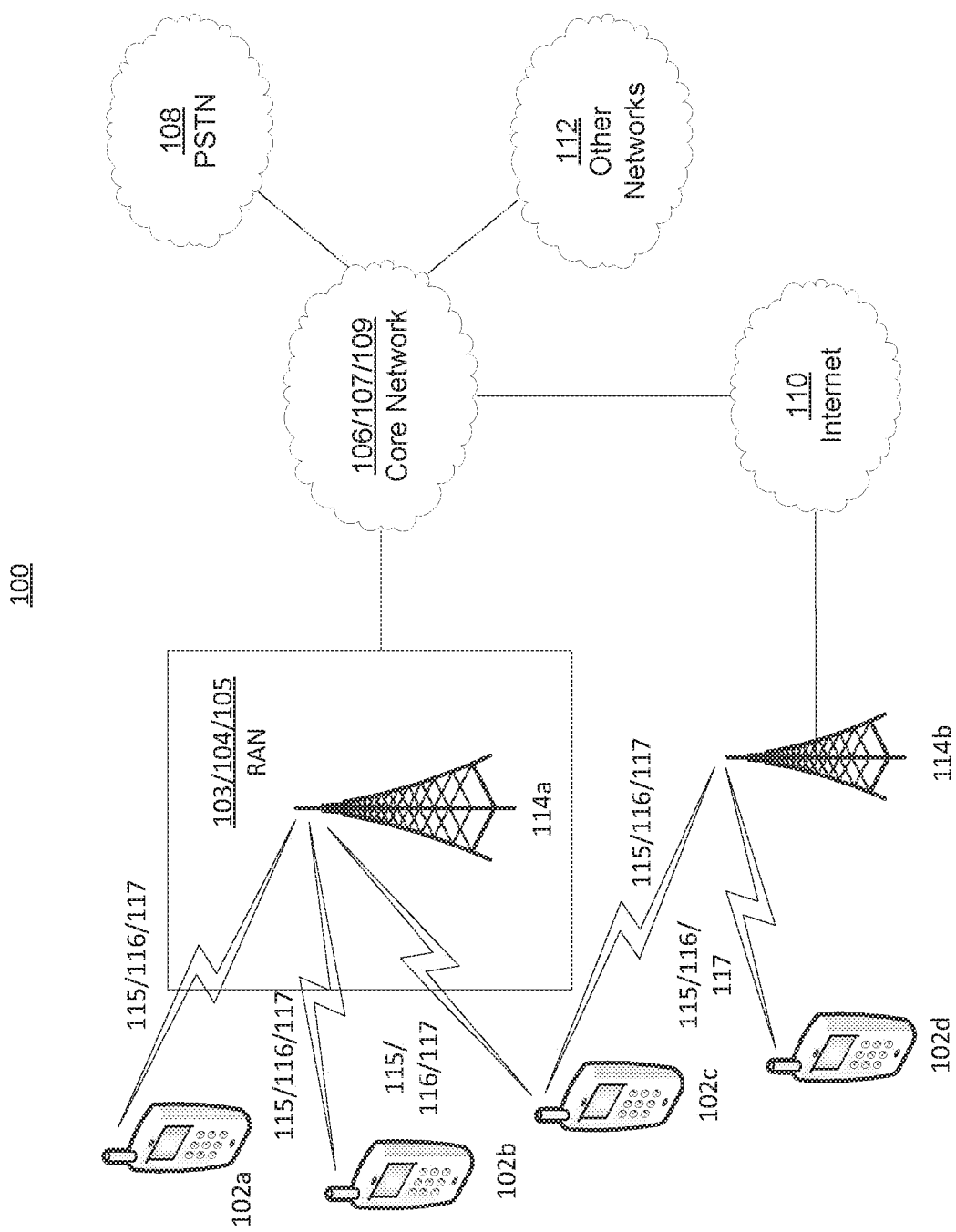
FIG. 24A is a system diagram of an example communications system in which one or more disclosed embodiments may be implemented.

FIG. 24A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 24A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 24A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 24A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 24A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 24A may be configured to communicate with the base station 114a, which may employ a cellular-based radio technology, and with the base station 114b, which may employ an IEEE 802 radio technology.

Figure 24B:
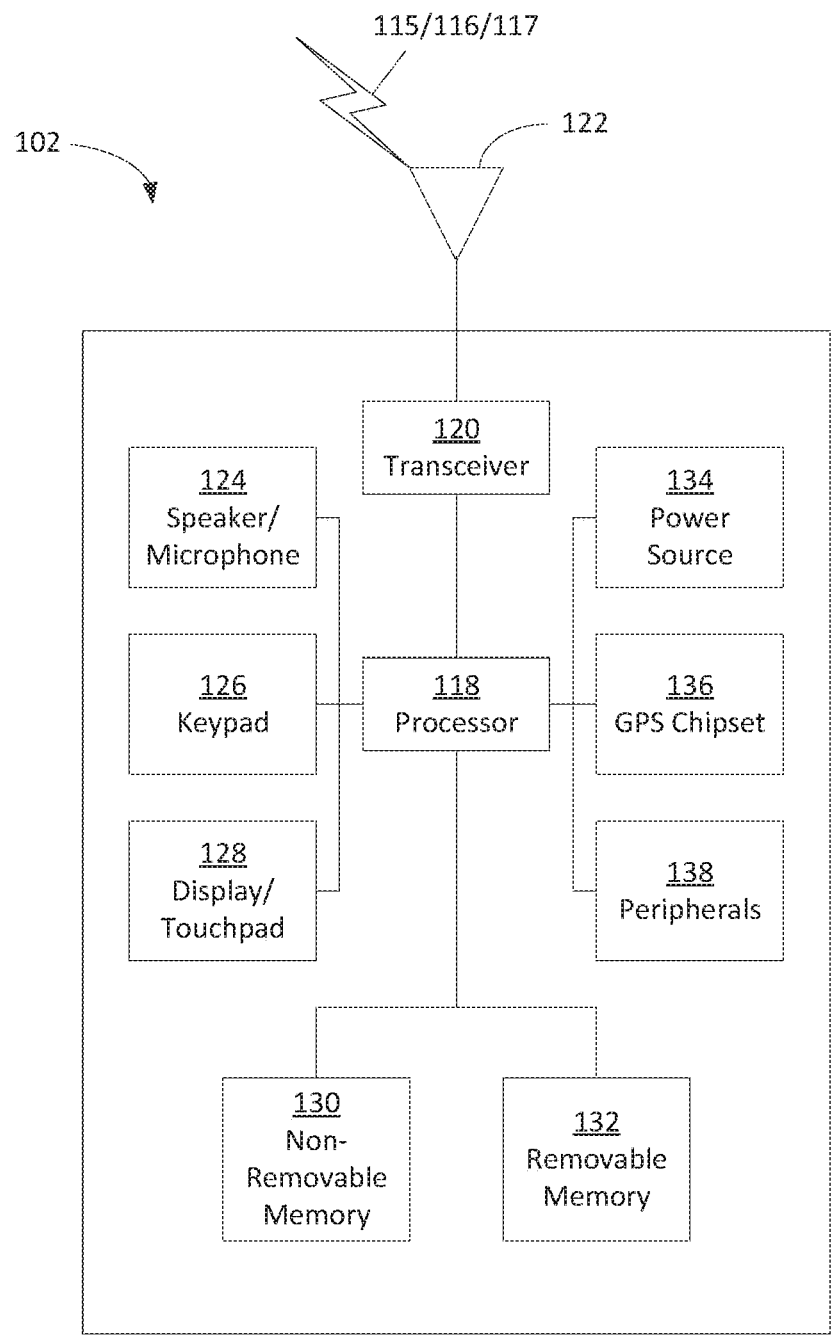
FIG. 24B is a system diagram of an example wireless transmit/receive unit (WTRU) that may be used within the communications system illustrated in FIG. 24A.

FIG. 24B is a system diagram of an example WTRU 102. As shown in FIG. 24B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 24B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 24B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 24B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands-free headset, a Bluetooth® module, a frequency modulated (FM) radio unit, a digital music player, a media player, a video game player module, an Internet browser, and the like.

Figure 24C:
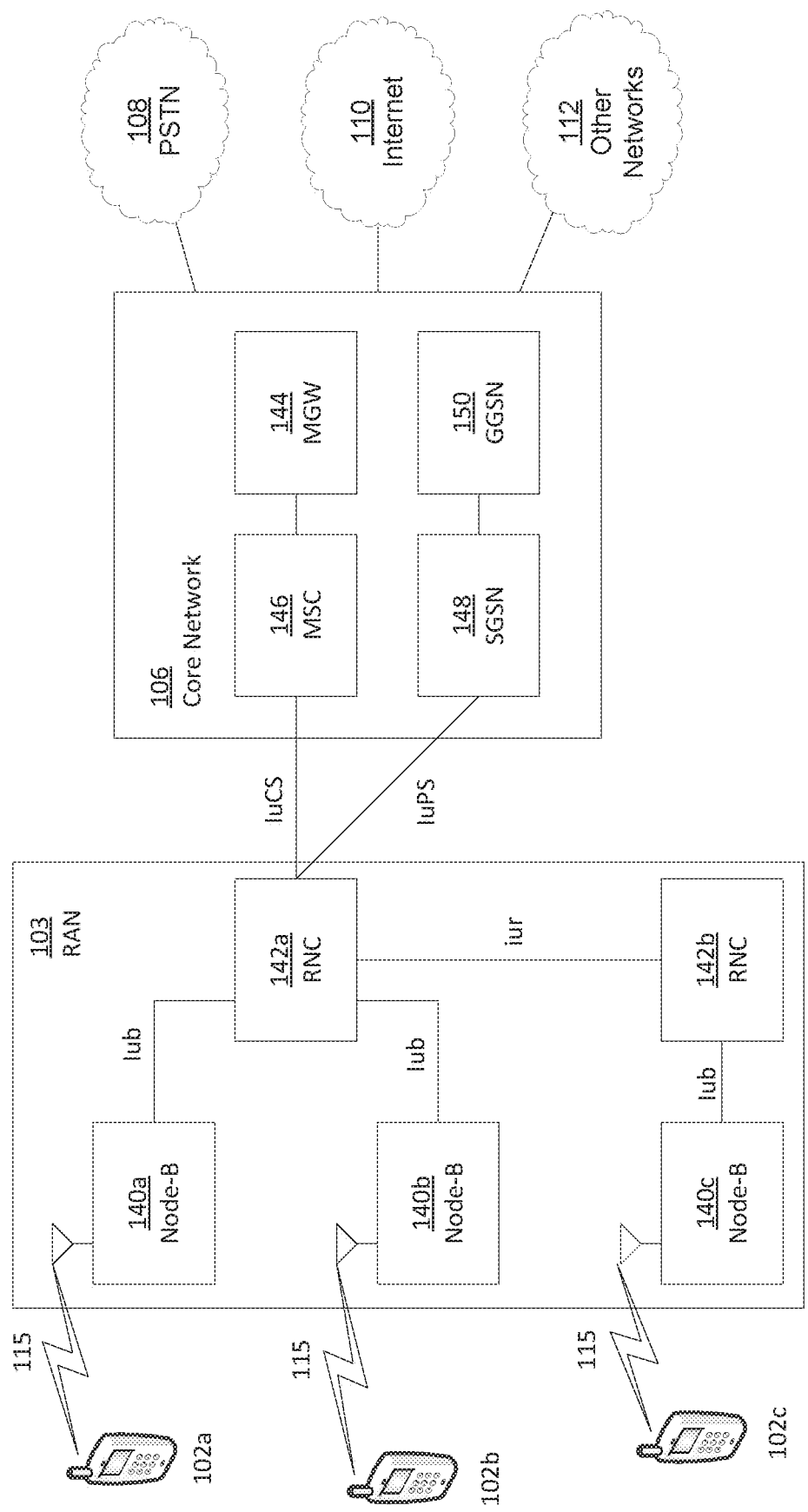
FIG. 24C is a system diagram of an example radio access network and an example core network that may be used within the communications system illustrated in FIG. 24A.

FIG. 24C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 24C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 24C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 24C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 24D:
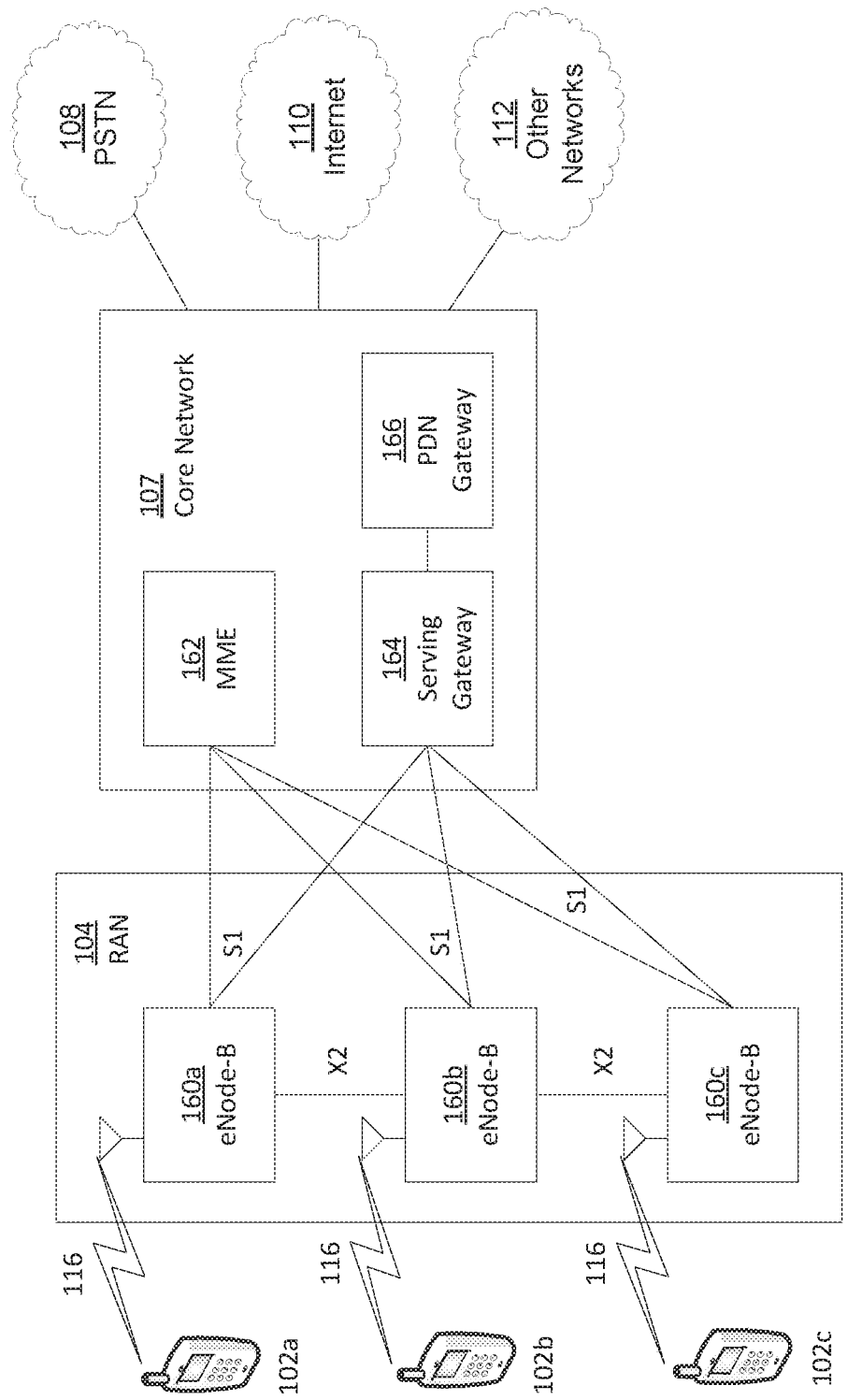
FIG. 24D is a system diagram of another example radio access network and an example core network that may be used within the communications system illustrated in FIG. 24A.

FIG. 24D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a cell (not shown) and may be configured to handle radio resource management decisions, handover decisions, scheduling of users in the uplink and/or downlink, and the like. As shown in FIG. 24D, the eNode-Bs 160a, 160b, 160c may communicate with one another over an X2 interface.

The core network 107 shown in FIG. 24D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 24E:
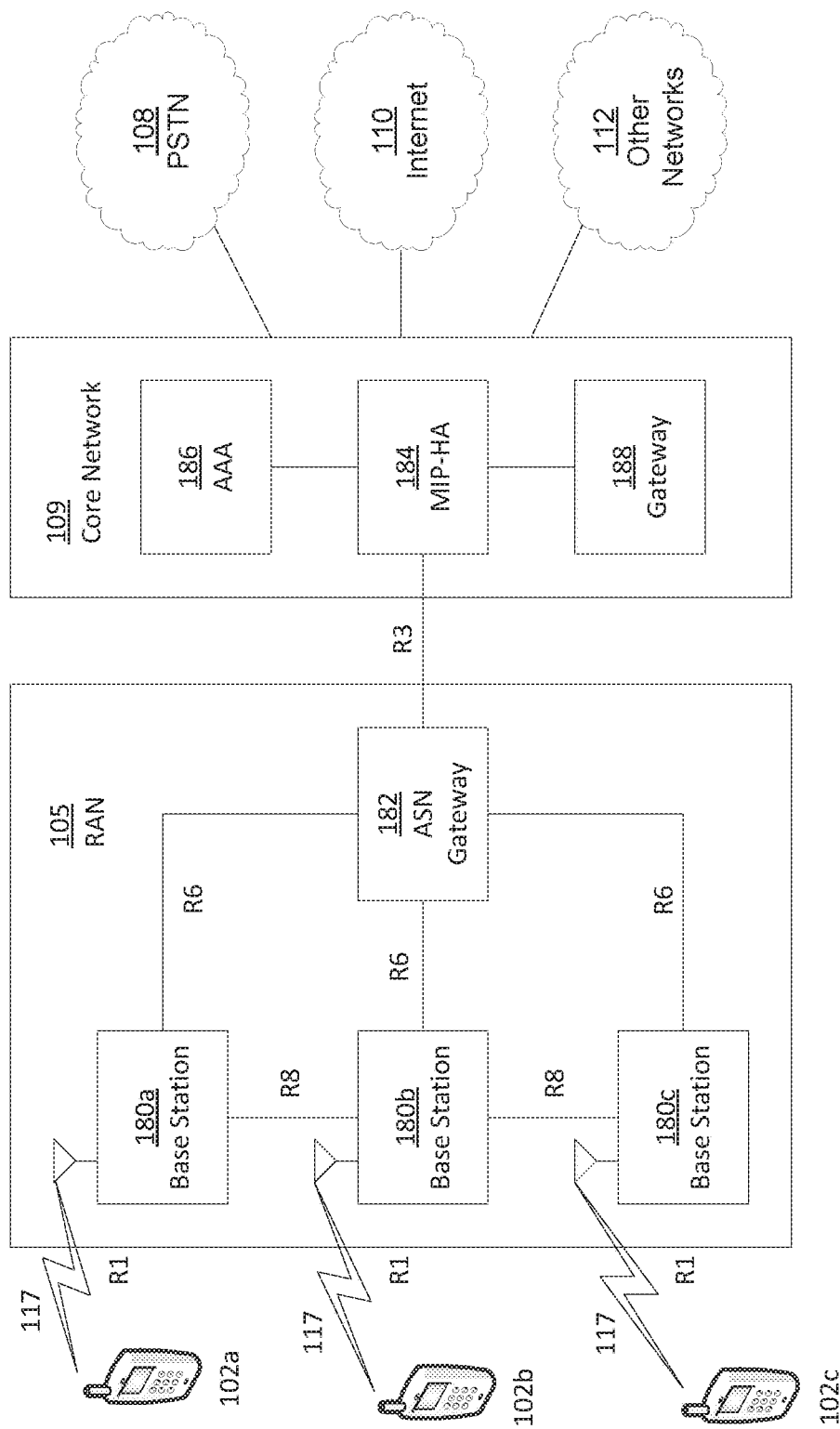
FIG. 24E is a system diagram of another example radio access network and an example core network that may be used within the communications system illustrated in FIG. 24A.

FIG. 24E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 24E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 24E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Each of the computing systems described herein may have one or more computer processors having memory that are configured with executable instructions or hardware for accomplishing the functions described herein including determining the parameters described herein and sending and receiving messages between entities (e.g., WTRU and network or client and server) to accomplish the described functions. The processes described above may be implemented in a computer program, software, and/or firmware incorporated in a computer-readable medium for execution by a computer and/or processor.

Although not shown in FIG. 24E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. An apparatus comprising:
a processor configured to:
receive a media presentation description (MPD) file associated with a 360 degree video;
request a first video layer in a first quality representation based on the received MPD file, the first video layer comprising the 360 degree video;
identify a first viewport of a user;
determine that the first viewport of the user is available;
on a condition that the first viewport of the user is available:
request content from a second video layer in a second quality representation based on the received MPD file, wherein the requested content is associated with the first viewport and the requested content is a first spatial subset of the 360 degree video, and
display the requested content overlaid onto the first video layer; and
on a condition that the first viewport of the user is unavailable, display the first video layer.

2. The apparatus of claim 1, wherein the processor is configured to:
determine that the user has changed the first viewport to a second viewport;
request content from a third video layer in a third quality representation based on the received MPD file, wherein the requested content is associated with the second viewport and the requested content is a second spatial subset of the 360 degree video; and
display the requested content overlaid onto the first video layer.

3. The apparatus of claim 1, wherein the processor is configured to:
request the first video layer in the first quality representation for a first segment length and request the content from the second video layer in the second quality representation for a second segment length, wherein the first segment length is longer than the second segment length.

4. The apparatus of claim 1, wherein the 360 degree video comprises a scalable 360 degree video.

5. The apparatus of claim 4, wherein the first video layer comprises a scalable base video layer associated with the scalable 360 degree video and the second video layer comprises a scalable enhanced video layer associated with the scalable 360 degree video.

6. The apparatus of claim 1, wherein the second quality representation has higher quality than the first quality representation.

7. The apparatus of claim 1, wherein the second video layer is coded with a higher bitrate, a higher resolution, or a higher frame rate than the first video layer.

8. A method comprising:
receiving a media presentation description (MPD) file associated with a 360 degree video;
requesting a first video layer in a first quality representation based on received MPD file, the first video layer comprising the 360 degree video
identifying a first viewport of a user,
determining that the first viewport of the user is available;
on a condition that the first viewport of the user is available:
requesting content from a second video layer in a second quality representation based on the received MPD file, wherein the requested content is associated with the first viewport and the requested content is a first spatial subset of the 360 degree video, and
displaying the requested content overlaid onto the first video layer and
on a condition that the first viewport of the user is unavailable, displaying the first video layer.

9. The method of claim 8, comprising:
determining that the user has changed the first viewport to a second viewport;
requesting content from a third video layer in a third quality representation based on the received MPD file, wherein the requested content is associated with the second viewport and the requested content is a second spatial subset of the 360 degree video; and
displaying the requested content overlaid onto the first video layer.

10. The method of claim 8, wherein the method comprises:
requesting the first video layer in the first quality representation for a first segment length and request the content from the second video layer in the second quality representation for a second segment length, wherein the first segment length is longer than the second segment length.

11. The method of claim 8, wherein the 360 degree video comprises a scalable 360 degree video.

12. The method of claim 11, wherein the first video layer comprises a scalable base video layer associated with the 360 degree video and the second video layer comprises a scalable enhanced video layer associated with the 360 degree video.

13. The method of claim 8, wherein the second video layer is coded with a higher bitrate, a higher resolution, or a higher frame rate than the first video layer.

14. The method of claim 8, wherein the second quality representation has higher quality than the first quality representation.

* * * * *